(12) United States Patent
Katou et al.

(10) Patent No.: US 10,570,327 B2
(45) Date of Patent: Feb. 25, 2020

(54) ORGANIC-INORGANIC COMPOSITE PARTICLES

(71) Applicant: MITSUBISHI CHEMICAL CORPORATION, Tokyo (JP)

(72) Inventors: Hanako Katou, Tokyo (JP); Shouhei Hirase, Tokyo (JP); Takumi Watanabe, Tokyo (JP); Shoya Yoda, Tokyo (JP); Shusaku Mandai, Tokyo (JP)

(73) Assignee: THE NIPPON SYNTHETIC CHEMICAL INDUSTRY CO., LTD., Osaka (JP)

(*) Notice: Subject to any disclaimer, the term of this patent is extended or adjusted under 35 U.S.C. 154(b) by 0 days.

(21) Appl. No.: 16/191,847

(22) Filed: Nov. 15, 2018

(65) Prior Publication Data
US 2019/0153290 A1  May 23, 2019

(30) Foreign Application Priority Data

Nov. 15, 2017  (JP) .................................. 2017-220192

(51) Int. Cl.
| | | |
|---|---|---|
| *E21B 43/26* | (2006.01) | |
| *C09K 8/42* | (2006.01) | |
| *C09K 8/487* | (2006.01) | |
| *C08L 29/04* | (2006.01) | |
| *C08K 5/5419* | (2006.01) | |

(52) U.S. Cl.
CPC ............ *C09K 8/426* (2013.01); *C08K 5/5419* (2013.01); *C08L 29/04* (2013.01); *C09K 8/487* (2013.01); *E21B 43/261* (2013.01); *C08K 2201/002* (2013.01)

(58) Field of Classification Search
CPC ...... C09K 8/426; C09K 8/487; C08K 5/5419; C08K 2201/002; E21B 43/261
See application file for complete search history.

(56) References Cited

U.S. PATENT DOCUMENTS

| 4,735,659 A | 4/1988 | Bishop |
| 5,391,674 A * | 2/1995 | Hara ...................... C08G 77/06 528/14 |

(Continued)

FOREIGN PATENT DOCUMENTS

| JP | S63-48341 A | 3/1988 |
| JP | 2002-53616 A | 2/2002 |
| JP | 2017-48267 A | 3/2017 |

*Primary Examiner* — Silvana C Runyan
(74) *Attorney, Agent, or Firm* — Greenblum & Bernstein, P.L.C.

(57) ABSTRACT

An object of the present invention is to improve the water dispersibility of the PVA-based resin and also to suppress the swelling of the PVA-based resin.

The object is achieved by organic-inorganic composite particles, which have an average particle size of preferably 1 μm to 3,000 μm, including a polyvinyl alcohol-based resin and a component having a three-dimensional siloxane cross-linked structure that is derived from a hydrolysis-polycondensation product of an alkoxysilane and/or a low condensate thereof, wherein the alkoxysilane includes a T unit and/or a Q unit as a structural unit (s), and a Si content with respect to a total weight of the composite particles is 0.1 wt % or more and 23 wt % or less in terms of $SiO_2$.

15 Claims, 1 Drawing Sheet

(56) References Cited

U.S. PATENT DOCUMENTS

| | | | | |
|---|---|---|---|---|
| 6,203,962 B1* | 3/2001 | Itami | ............... | G03G 5/14773 |
| | | | | 399/350 |
| 2005/0147758 A1* | 7/2005 | Mao | ............... | A61L 27/34 |
| | | | | 427/372.2 |
| 2006/0078604 A1* | 4/2006 | Kanios | ............... | A61K 9/7061 |
| | | | | 424/449 |
| 2013/0284518 A1* | 10/2013 | Wu | ............... | C09K 8/035 |
| | | | | 175/65 |

* cited by examiner

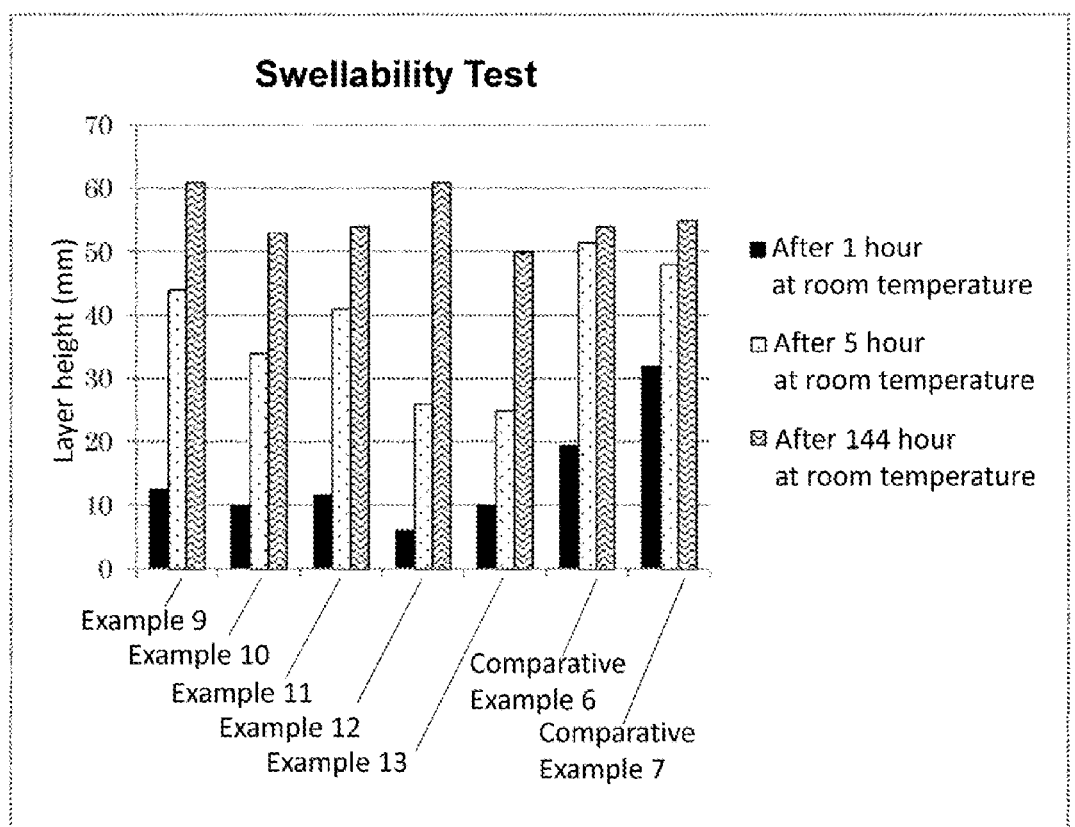

ORGANIC-INORGANIC COMPOSITE PARTICLES

TECHNICAL FIELD

The present invention relates to composite particles of a polyvinyl alcohol-based resin and a silicon compound.

BACKGROUND ART

Polyvinyl alcohol-based (hereinafter, also referred to as "PVA-based") resins are used as water-soluble resins in a variety of fields such as coating agents, water-soluble binders, emulsification dispersants, and admixtures for civil engineering and construction materials (gypsum and cement). Particularly, when a PVA-based resin in the form of particles is dissolved in water for use, despite that the PVA-based resin particles are highly soluble in water, the surfaces thereof are swollen before the particles are dispersed in water and the particles are thereby agglomerated to form lumps, as a result of which a required amount of the PVA-based resin is not dissolved and partially remains undissolved in some cases. This tendency is prominent especially in PVA-based resin particles having a high low-temperature solubility. Moreover, the agglomerated particles that are left undissolved may be swollen and form large lumps to not only cause a delay in the dissolving operation but also interfere with processes by adhering to a stirring blade and a flow path.

With regard to these problems, various methods of improving dispersibility of PVA-based resin particles in water are conventionally known.

For example, Patent Document 1 discloses a technology for improving dispersibility of a water-soluble polymer in water by bringing water-soluble polymer in the form of fine particles into contact with 0.1 wt % to 10 wt % of hydrophobic fumed silica to coat the hydrophobic fumed silica with water-soluble polymer.

Further, since PVA-based resin particles having a high low-temperature solubility are likely to form lumps, it has been examined to suppress lump formation by using low-solubility PVA-based resin particles; however, there is a problem that such suppression of lump formation leads to a reduction in solubility. In view of this, Patent Literature 2 discloses a technology for obtaining a polyvinyl alcohol-based polymer having a high improvement effect in terms of solubility, which polymer not only can be dispersed without lump formation when added to warm water of 50° C. or higher or hot water but also is completely dissolved at 90° C. to 95° C. to yield an aqueous solution, by producing a polyvinyl alcohol-based polymer having few branches with introduction of a specific catalyst to a polymerization system under specific conditions to improve the crystallinity and by further restricting the saponification conditions.

Moreover, Patent Literature 3 discloses a technology for dissolving water-soluble polymer particles, in which a water-soluble polymer having a high dissolution rate in water is used as a nucleus and is coated with a water-soluble polymer having a low water solubility, into water, warm water or hot water without lump formation.

PRIOR ART DOCUMENT

Patent Literature

Patent Literature 1: JP S63-48341 A
Patent Literature 2: JP 2002-53616 A
Patent Literature 3: JP 2017-48267 A

SUMMARY OF THE INVENTION

Technical Problem

As described above, there have been proposed technologies for attaining both an improvement in water dispersibility and satisfactory solubility. However, in the technology of Patent Literature 1, swelling of the polyvinyl alcohol-based polymer cannot be suppressed due to infiltration of water through gaps between fumed silica particles, and the technology of Patent Literature 2 is not applicable to all kinds of polyvinyl alcohol-based polymers. In the technology of Patent Literature 3, the coating layer is made of a PVA-based resin and thus swollen; therefore, although lumps are not formed, swelling cannot be suppressed.

In this manner, in the prior art, it was difficult to attain both an improvement in water dispersibility and suppression of swelling of PVA-based resin particles. Particularly, it was difficult to reduce the initial solubility (solubility in an initial stage where PVA-based resin powder is added to water and starts to be dissolved) and the swellability while maintaining the low-temperature solubility (long-term solubility).

Moreover, PVA-based resin particles may also be used in those applications where dissolution thereof is suppressed by modification, intraparticle crosslinking or the like and the particles are used as a water-absorbing polymer; however, it was difficult to suppress swelling, particularly initial swelling, while maintaining a high water-absorbing property.

An object of the present invention is to provide composite particles in which an improvement in water dispersibility, suppression of initial dissolution and suppression of swelling, of PVA-based resin particles can all be achieved at the same time.

Solution to Problem

The present inventors intensively studied to solve the above-described problems and consequently discovered that organic-inorganic composite particles, which include a PVA-based resin and a component having a three-dimensional siloxane crosslinked structure that is derived from a hydrolysis-polycondensation product of an alkoxysilane and/or a low condensate thereof, can suppress initial dissolution of the PVA-based resin contained therein, improve the dispersibility of the PVA-based resin after being added to water, and also suppress swelling of the PVA-based resin, thereby arriving at the present invention.

The present invention encompasses the followings.
<1> An organic-inorganic composite particles comprising a polyvinyl alcohol-based resin and a component having a three-dimensional siloxane crosslinked structure that is derived from a hydrolysis-polycondensation product of an alkoxysilane and/or a low condensate thereof, wherein the alkoxysilane comprises a T unit and/or a Q unit as a structural unit(s), and a Si content with respect to a total weight of the composite particles is 0.1 wt % or more and 23 wt % or less in terms of $SiO_2$.
<2> The composite particles according to <1>,
wherein the composite particles have a structure in which the polyvinyl alcohol-based resin is coated with a $SiO_2$ layer comprising the three-dimensional siloxane crosslinked structure.
<3> The composite particles according to <1>,
wherein the composite particles have a structure in which the polyvinyl alcohol-based resin is coated with a hybrid film that comprises the component having the three-dimensional siloxane crosslinked structure and a water-soluble resin.

<4> The composite particles according to <3>,
wherein the hybrid film has a Si content of 15 wt % or more and less than 100 wt % in terms of $SiO_2$.

<5> The composite particles according any one of <2> to <4>,
wherein the component having the three-dimensional siloxane crosslinked structure also exists in the vicinity of the surface of the polyvinyl alcohol-based resin that is coated.

<6> The composite particles according to any one of <1> to <4>,
wherein the component having the three-dimensional siloxane crosslinked structure uniformly exists inside the polyvinyl alcohol-based resin.

<7> The composite particles according to any one of <1> to <6>,
wherein the polyvinyl alcohol-based resin is a nonionic group-containing polyvinyl alcohol-based resin.

<8> The composite particles according to any one of <1> to <7>,
wherein the composite particles have a Si—O—C structure that is derived from a reaction between a hydroxy group of the polyvinyl alcohol-based resin and a hydroxy group of the hydrolysis-polycondensation product of the alkoxysilane and/or low condensate thereof.

<9> A diverting agent comprising the organic-inorganic composite particles according to <1> to <8>.

<10> A lost circulation material comprising the organic-inorganic composite particles according to any one of <1> to <8>.

<11> A fracture plugging method comprising temporarily sealing of fractures in a well wall with the diverting agent according to <9>.

<12> A method of preventing lost circulation of drilling mud,
wherein the method comprises filling of fractures in a well wall with the lost circulation material according to <10>.

Advantageous Effects of Invention

In the composite particles provided by the present invention, not only initial dissolution of the PVA-based resin used therein can be suppressed while maintaining the long-term solubility of the PVA-based resin but also the dispersibility of the PVA-based resin after addition of the composite particles to water can be improved and swelling of the PVA-based resin can be suppressed, all without modification of the molecular structure of the PVA-based resin. Further, the composite particles provided by the present invention not only exhibit reduced agglomeration and lump formation that are caused by swelling, but also are less likely to agglomerate with each other even when dried, exhibiting improved powder flow characteristics.

BRIEF DESCRIPTION OF THE DRAWING

The Drawing is a graph showing the results of the swellability tests conducted in Examples 9 to 13 and Comparative Examples 6 and 7.

DESCRIPTION OF EMBODIMENTS

The present invention will now be described in detail according to embodiments thereof. It is noted here, however, that the present invention is not limited to the embodiments explicitly or implicitly described in the present specification.

The composite particles according to one embodiment of the present invention are organic-inorganic composite particles comprising a polyvinyl alcohol-based resin and a component having a three-dimensional siloxane crosslinked structure that is derived from a hydrolysis-polycondensation product of an alkoxysilane and/or a low condensate thereof.

(1) Polyvinyl Alcohol-Based (PVA-Based) Resin

The PVA-based resin used in this embodiment is not particularly limited in terms of its concrete structure, as long as the PVA-based resin is a resin having a vinyl alcohol structural unit. The PVA-based resin can be typically obtained by saponifying a polycarboxylic acid vinyl ester generated by polymerization of a carboxylic acid vinyl ester monomer such as vinyl acetate; however, the method of producing the PVA-based resin is not limited thereto.

The PVA-based resin may be, for example, an unmodified PVA or a modified PVA-based resin.

The modified PVA-based resin may be a copolymerization-modified PVA-based resin synthesized by copolymerizing a monomer other than a vinyl ester monomer that provides a PVA structural unit, or a post-modified PVA-based resin obtained by synthesizing an unmodified PVA and subsequently modifying its main chain or side chain with an appropriate compound.

Examples of a copolymerizable monomer (unsaturated monomer) that can be used in the copolymerization-modified PVA-based resin include olefins, such as ethylene, propylene, isobutylene, α-octene, α-dodecene, and α-octadecene; hydroxy group-containing α-olefins, such as 3-buten-1-ol, 4-penten-1-ol and 5-hexen-1-ol, and acylation products or other derivatives thereof; unsaturated acids, such as acrylic acid, methacrylic acid, crotonic acid, maleic acid, maleic anhydride, itaconic acid and undecylenic acid, and salts, monoesters and dialkyl esters thereof; amides, such as diacetone acrylamide, acrylamide, and methacrylamide; olefin sulfonic acids, such as ethylene sulfonic acid, allyl sulfonic acid and methallyl sulfonic acid, and salts of thereof; quaternary ammonium salts, such as diallyldimethylammonium chloride and diallyldiethylammonium bromide; substituted vinyl acetates, such as isopropenyl acetate and 1-methoxyvinyl acetate; and poly(oxyalkylene) group-containing allyl ethers such as polyethylene glycol allyl ether, methoxypolyethylene glycol allyl ether, polypropylene glycol allyl ether and polyethylene glycol-polypropylene glycol allyl ether.

Further, examples of the copolymerization-modified PVA-based resin include PVA-based resins having a primary hydroxy group in a side chain. Examples of such PVA-based resins include side-chain 1,2-diol-modified PVA-based resins obtained by copolymerizing 3,4-diacetoxy-1-butene, vinyl ethylene carbonate, glycerol monoallyl ether or the like; and PVA-based resins having a hydroxymethyl group in a side chain that are obtained by copolymerizing a hydroxymethyl vinylidene diacetate, such as 1,3-diacetoxy-2-methylene propane, 1,3-dipropionyloxy-2-methylene propane or 1,3-dibutylonyloxy-2-methylene propane, and saponifying the resultant.

Examples of a post-modification method for obtaining the post-modified PVA-based resin include methods involving acetoacetic esterification, acetalization, urethanization, etherification, grafting, phosphoric esterification, or oxyalkylenation of an unmodified PVA or any of the above-described modified PVA-based resins.

In this embodiment, any of the above-described unmodified PVAs and modified PVAs can be used, however, a partially saponified product is preferred in the case of an unmodified PVA, and an anionic modification group-containing PVA having a highly hydrophilic functional group, such as a carboxylic acid group or a sulfonic acid group, in a side chain; a cationic modification group-containing PVA having a quaternary ammonium salt group or the like; a nonionic modification group-containing PVA having a hydroxyalkyl group, an oxyethylene group; or the like is preferred in the case of a modified PVA.

When the primarily object is to suppress initial dissolution, nonionic modification group-containing PVAs are preferred since they only have a small effect particularly on the formation of the below-described three-dimensional siloxane crosslinked structure and, thereamong, a primary hydroxy group-containing modified PVA, which is capable of improving the hydrophilicity by disrupting the crystallinity while maintaining the intermolecular hydrogen bond strength characteristic to PVAs, can be particularly preferably used.

Especially, a modified PVA having a 1,2-diol structural unit represented by the following formula (1) is preferred since such a modified PVA exhibits excellent solubility after being dispersed in water, has excellent affinity to a component having a three-dimensional siloxane crosslinked structure that is formed on the surface and/or inside of the composite particles by a high hydrogen bonding force, and an effect of suppressing initial solubility and swellability is likely to be attained.

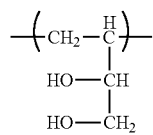

(1)

When the PVA-based resin has the structural unit represented by formula (1), the content of the structural unit represented by formula (1) in the PVA-based resin is not particularly limited, however, it is usually not less than 0.01 mol %, preferably not less than 0.1 mol %, more preferably not less than 0.5 mol %, but usually 20 mol % or less, preferably 15 mol % or less, more preferably 10 mol % or less. When the content is excessively low, the solubility tends to be overly reduced, whereas when the content is excessively high, the solubility tends to be overly increased.

The PVA-based resin is variable in solubility depending on the saponification degree and the polymerization degree. The saponification degree of the PVA-based resin is not particularly limited, however, when the PVA-based resin is an unmodified PVA, the saponification degree is usually not lower than 70 mol %, preferably 78 mol % to 95 mol %, particularly preferably 85 mol % to 90 mol %. Usually, PVA-based resins have a tendency of showing the highest dissolution rate at a saponification degree of about 88 mol %, although this is slightly variable depending on the polymerization degree, the type of modification, and the like. Accordingly, the solubility tends to be reduced when the saponification degree is either excessively higher than or excessively lower than about 88%.

When the PVA-based resin has the structural unit represented by formula (1), it exhibits a high solubility even at a high saponification degree; therefore, the saponification degree is usually 85 mol % or higher, preferably 90 v or higher, more preferably 98 mol % or higher. Further, the upper limit thereof is usually 100 mol % or lower, preferably 99.8 mol % or lower. The saponification degree is a value measured by a titration method according to JIS K 6726.

The average polymerization degree of the PVA-based resin is not particularly limited, however, when the PVA-based resin is an unmodified PVA, the average polymerization degree is usually 200 to 3,000, preferably 250 to 2,800, particularly preferably 300 to 2,600.

When the PVA-based resin has the structural unit represented by formula (1), the average polymerization degree is usually 100 or higher, preferably 200 or higher, more preferably 250 or higher. By controlling the average polymerization degree in this range, an excessive increase in the solubility is likely to be inhibited. Further, the average polymerization degree is usually 4,000 or lower, preferably 3,500 or lower, more preferably 2,800 or lower. By controlling the average polymerization degree in this range, an excessive decrease in the solubility is likely to be inhibited. The average polymerization degree is a value measured by an aqueous solution viscosity measuring method (JIS K 6726).

As the PVA-based resin, a single resin may be used alone, or two or more resins may be used by blending. In the latter case, the two or more resins may have different structural units, different saponification degrees, and/or different average polymerization degrees. When such resins are used by blending, the PVA-based resin may have any saponification degree, average polymerization degree and the like as long as the PVA-based resins as a whole have the average values within the above-described respective ranges.

The PVA-based resin may be partially modified as well. When the PVA-based resin is modified, the modification rate of the PVA-based resin is preferably in such a range that, when 10 g of particles of the resin is dispersed in 100 g of 20° C. water with stirring and the resultant is subsequently heated to 90° C. with stirring at a rate of 1° C./min, not less than 90 wt % of the particles is dissolved within 60 minutes.

The type of the modification is not particularly limited as long as the modified PVA-based resin is soluble in water, however, when a strong acid or a basic group is introduced in water, the modification amount is preferably in such a range that the modification does not show any catalytic effect in the process of forming a three-dimensional siloxane crosslinked structure.

In cases where the composite particles of the present invention are used as a lost circulation material, it is preferred to use a highly water-absorbing PVA-based resin for the purpose of improving the plugging effect. As such a PVA-based resin, it is preferred to use a crosslinked product obtained by crosslinking a carboxyl group-containing PVA-based resin.

A crosslinked product of a carboxyl group-containing PVA-based resin will now be described.

As a method of forming the crosslinked product (crosslinking method), for example, a heat treatment, a crosslinking agent treatment, a UV irradiation treatment, and an electron beam irradiation treatment can be employed. Among these methods, a heat treatment is preferably employed to produce a thermally crosslinked product. The crosslinking method is described below.

First, a crosslinking method based on a heat treatment will be described.

As a heat treatment method, for example, a method of subjecting a carboxyl group-containing PVA-based resin to a specific heat treatment is usually employed. As a heat treatment condition, the heat treatment temperature is usually 100° C. to 220° C., preferably 120° C. to 200° C., more preferably 130° C. to 150° C. By setting the heat treatment temperature to be not lower than this lower limit value, the water resistance is improved and, by setting the heat treatment temperature to be not higher than this upper limit value, the treatment can be performed without risking degradation of the PVA-based resin. Further, the heat treatment time is usually 10 minutes to 600 minutes, preferably 20 minutes to 400 minutes, more preferably 100 minutes to 200 minutes. By setting the heat treatment time to be not shorter than this lower limit value, the water resistance is improved and, by setting the heat treatment time to be not longer than this upper limit value, the treatment can be performed without risking degradation of the PVA-based resin.

It is also possible to perform the heat treatment by melt extrusion or the like.

In the present invention, a thermally crosslinked product of a carboxyl group-containing PVA-based resin is preferably obtained by heating the PVA-based resin at 100° C. to 220° C. for 10 minutes to 600 minutes.

The oxygen concentration in the heat treatment is usually 3 vol % to 25 vol %, preferably 5 vol % to 23 vol %, more preferably 10 vol % to 21 vol %. By controlling the oxygen concentration to be not lower than this lower limit value, the water resistance is improved and, by controlling the oxygen concentration to be not higher than this upper limit value, the treatment can be performed without risking degradation of the PVA-based resin.

Further, the nitrogen concentration in the heat treatment is usually 75 vol % to 98 vol %, preferably 78 vol % to 95 vol %, more preferably 80 vol % to 90 vol %. By controlling the nitrogen concentration to be not lower than this lower limit value, the treatment can be performed without risking degradation of the PVA-based resin and, by controlling the nitrogen concentration to be not higher than this upper limit value, the water resistance is improved.

The Yellow Index (YI) value, which represents the yellowness of the thermally crosslinked product obtained by the heat treatment, is usually 20 to 100, preferably 25 to 80, more preferably 55 to 65. By controlling the YI value to be not lower than this lower limit value, the water resistance is improved and, by controlling the YI value to be not higher than this upper limit value, the water-absorbing property of the PVA-based resin is improved.

The YI value can be determined by a method according to JIS K 7373:2006.

Next, a crosslinking method using a crosslinking agent will be described.

As a crosslinking agent in the crosslinking agent treatment, any compound known as a crosslinking agent of a carboxyl group-containing PVA-based resin can be used. Examples thereof include aldehyde compounds such as monoaldehyde compounds, such as formaldehyde and acetaldehyde, and polyvalent aldehyde compounds, such as glyoxal, glutaraldehyde and dialdehyde starch; amine compounds, such as m-xylene diamine, norbornane diamine, 1,3-bis-aminomethylcyclohexane, bis-aminopropylpiperazine, 3,3'-dimethyl-4,4'-diaminodicyclohexylmethane, 4,4'-diaminodicyclohexylmethane, 4,4'-diaminodiphenylmethane, 3,3',5,5'-tetramethyl-4,4'-diaminodiphenylmethane, 3,3',5,5'-tetraethyl-4,4'-diaminodiphenylmethane, 3,3'-dimethyl-4,4'-diamino-5,5'-diethyldiphenylmethane, 4,4'-diaminodiphenyl ether, diaminodiphenyl sulfone, 1,2-phenylenediamine, 1,3-phenylenediamine, 1,4-phenylenediamine, 3-methyl-1,2-phenylenediamine, 4-methyl-1,2-phenylenediamine, 2-methyl-1,3-phenylenediamine, 4-methyl-1,3-phenylenediamine, 2-methyl-4,6-diethyl-1,3-phenylenediamine, 2,4-diethyl-6-methyl-1,3-phenylenediamine, 2,4,6-trimethyl-1,3-phenylenediamine, and 2-chloro-1,4-phenylenediamine; methylol compounds such as methylolated urea and methylolated melamine; reaction products of ammonia and formaldehyde, such as hexamethylenetetramine; boron compounds such as boric acid and borax; zirconium compounds such as basic zirconyl chloride, zirconyl nitrate, and ammonium zirconium acetate; titanium compounds such as titanium orthoesters, such as tetramethyl titanate, titanium chelates, such as titanium ethylacetoacetonate, and titanium acylates, such as polyhydroxytitanium stearate; aluminum compounds such as aluminum organic acid chelates, such as aluminum acetylacetonate; organic reactive group-containing organoalkoxysilane compounds such as silane coupling agents; polyvalent epoxy compounds such as ethylene glycol diglycidyl ether, polyethylene glycol diglycidyl ether, glycerol diglycidyl ether, glycerol triglycidyl ether, hexanediol diglycidyl ether, and trimethylolpropane triglycidyl ether; various isocyanate compounds; and polyamide polyamine-epihalohydrin-based resins such as polyamide polyamine-epichlorohydrin-based resins. Thereamong, a polyamide polyamine-epichlorohydrin-based resin is particularly preferred.

The content of the crosslinking agent is preferably 0.05 parts to 30 parts by mass, more preferably 0.5 parts to 20 parts by mass, particularly preferably 1 part to 10 parts by mass, with respect to 100 parts by mass of the carboxyl group-containing PVA-based resin. When the content of the crosslinking agent is excessively low, the effect provided by the crosslinking agent tends to be poor, however, when the content of the crosslinking agent is equal to or lower than the upper limit value, a high water absorptivity can be easily maintained.

As a method of mixing the carboxyl group-containing PVA-based resin and the crosslinking agent, for example, (i) a method of mixing an aqueous solution of the carboxyl group-containing PVA-based resin and an aqueous solution of the crosslinking agent, (ii) a method of spraying an aqueous solution of the crosslinking agent to the carboxyl group-containing PVA-based resin in a solid form (e.g., powder), or (iii) a method of spraying an aqueous solution of the carboxyl group-containing PVA-based resin to the crosslinking agent in a solid form can be employed. Thereamong, the method of (ii) is preferred since it can yield a solid crosslinked product with a short drying time.

The shape of the particles of the PVA-based resin is not particularly limited. The particles may have any one of, or any combination of a spherical shape, a needle shape, a cylindrical shape, a rugby ball shape, a plate shape, a crushed shape, an amorphous shape and the like, in accordance with the intended purpose.

The PVA-based resin may be one available on the market, or may be obtained through synthesis. When the PVA-based resin is synthesized, the synthesis can be performed by a known method.

(2) Component Having Three-Dimensional Siloxane Crosslinked Structure

The composite particles of this embodiment contain, on the surfaces and/or inside thereof, a component having a three-dimensional siloxane crosslinked structure that is derived from a hydrolysis-polycondensation product of an alkoxysilane and/or a low condensate thereof. By incorporating the component having a three-dimensional siloxane crosslinked structure into the composite particles, not only the initial dissolution of the PVA-based resin contained in the composite particles can be suppressed and the dispersibility of the PVA-based resin after addition of the composite particles to water can be improved, but also swelling of the PVA-based resin can be suppressed.

The term "three-dimensional siloxane crosslinked structure" used herein means a three-dimensional network structure that is mainly constituted by siloxane units formed by hydrolytic polycondensation of a trialkoxysilane having three alkoxy groups per molecule and/or a tetraalkoxysilane having four alkoxy groups per molecule with one another as the above-described alkoxysilane.

The three-dimensional siloxane crosslinked structure is derived from a hydrolysis-polycondensation product of an alkoxysilane and/or a low condensate thereof and has a T unit and/or a Q unit as its structural unit(s). The T unit represents a unit in which three oxygen atoms are bound to a Si atom, and the Q unit represents a unit in which four oxygen atoms are bound to a Si atom. The alkoxysilane may also contain a unit other than the T unit and the Q unit, such as an M unit in which a single oxygen atom is bound to a Si atom or a D unit in which two oxygen atoms are bound to a Si atom. In the alkoxysilane and/or low condensate thereof, the amount of the T unit is usually not less than 0 mol %, but usually 20 mol % or less, preferably 10 mol % or less, particularly preferably 5 mol % or less. Further, in the alkoxysilane and/or low condensate thereof, the amount of the Q unit is usually not less than 80 mol %, preferably not less than 90 mol %, particularly preferably not less than 95 mol %, but usually 100 mol % or less. In the alkoxysilane and/or low condensate thereof, the total amount of the T unit and the Q unit is usually not less than 80 mol %, preferably not less than 90 mol %, more preferably not less than 95 mol %, but usually 100 mol % or less.

The alkoxysilane is not particularly limited as long as it is an alkoxy group-containing silane, and examples of the alkoxy group include aliphatic alkoxy groups having 1 to 10 carbon atoms such as a methoxy group, an ethoxy group, a propoxy group, and a butoxy group; and aromatic alkoxy groups having 6 to 15 carbon atoms such as a phenoxy group and an aryloxy group. From the standpoint of the ease of controlling the hydrolysis reaction, the alkoxy group is preferably an aliphatic alkoxy group having 1 to 4 carbon atoms.

Examples of the alkoxysilane include monoalkoxysilanes, dialkoxysilanes, trialkoxysilanes, and tetraalkoxysilanes.

More specific examples of the alkoxysilane include monoalkoxysilanes such as vinyldimethylethoxysilane; dialkyldialkoxysilanes such as dimethyldimethoxysilane; diaryldialkoxysilanes; amino group-containing dialkoxysilanes such as 3-aminopropylmethyldimethoxysilane and 3-[N-(2-aminoethyl)amino]propylmethyldimethoxysilane; mercapto group-containing dialkoxysilanes such as 3-mercaptopropylmethyldimethoxysilane; (meth)acryloyl group-containing dialkoxysilanes such as 3-(meth)acryloxypropylmethyldimethoxysilane); alkenyl group-containing dialkoxysilanes such as vinyldimethoxymethylsilane and vinylmethyldiethoxysilane; and epoxy group-containing dialkoxysilanes such as 3-glycidyloxypropylmethyldimethoxysilane, 3-glycidyloxypropylmethyldiethoxysilane, and 3-glycidyloxypropylethyldiethoxysilane.

Examples of the alkoxysilane also include hydrosilyl group-containing trialkoxysilanes such as trimethoxysilane; alkyltrialkoxysilanes such as methyltriethoxysilane, methyltrimethoxysilane, ethyltrimethoxysilane, and ethyltriethoxysilane; aryltrialkoxysilanes such as phenyltrimethoxysilane and phenyltriethoxysilane; amino group-containing trialkoxysilanes such as 2-aminoethyltrimethoxysilane and 2-[N-(2-aminoethyl)amino]ethyltrimethoxysilane; mercapto group-containing trialkoxysilanes such as 3-mercaptopropyltrimethoxysilane; alkenyl group-containing trialkoxysilanes such as vinyltrimethoxysilane; (meth)acryloyl group-containing trialkoxysilanes such as 2-(meth)acryloxyethyltrimethoxysilane and 2-(meth)acryloxyethyltriethoxysilane; epoxy group-containing trialkoxysilanes such as (glycidyloxyalkyl)trialkoxysilanes (e.g., 3-glycidyloxypropyltrimethoxysilane, 3-glycidyloxypropyltriethoxysilane, 2-(3,4-epoxycyclohexyl)ethyltrimethoxysilane, and 2-(3,4-epoxycyclohexyl)ethyltriethoxysilane); and isocyanate group-containing trialkoxysilanes such as γ-isocyanopropyltrimethoxysilane and γ-isocyanopropyltriethoxysilane.

Examples of the alkoxysilane further include tetraalkoxysilanes such as tetramethoxysilane, tetraethoxysilane, tetrapropoxysilane, and tetrabutoxysilane.

Among these alkoxysilanes, tetraalkoxysilanes and trialkoxysilanes are preferred, and tetraalkoxysilanes are more preferred, since composite particles of these alkoxysilanes with a PVA-based resin not only have a small amount of introduced hydrophobic groups bound to silicon and are thus readily wetted with water, but also their three-dimensional siloxane crosslinked structures are highly crosslinked and thus have a high effect of suppressing initial dissolution of the resin, allowing the composite particles to have good dispersibility in water.

These alkoxysilanes may be used individually, or two or more thereof may be used in combination.

From the standpoint that the present invention is aimed at suppressing initial dissolution and swelling of a PVA-based resin by introduction of a three-dimensional siloxane crosslinked structure, it is preferred to use a monoalkoxysilane or a dialkoxysilane, which is a low-crosslinkable component, as an additive for imparting functionality, and to control the amount thereof to be as small as possible so that dissolution and swelling of the PVA-based resin component contained in the composite particles are not facilitated.

The alkoxysilane and/or low condensate thereof is hydrolyzed in a solvent to form a three-dimensional siloxane crosslinked structure as a hydrolysis-polycondensation product. The term "low condensate" used herein means an alkoxysilane oligomer of about 2 to 10 monomers, and the low condensate may be an oligomer of about 2 to 8 monomers, or an oligomer of about 2 to 5 monomers. As the solvent, for example, a lower alcohol having 1 to 4 carbon atoms, such as methanol, ethanol or propanol, or a mixture thereof with water, is usually used.

The component having a three-dimensional siloxane crosslinked structure that is contained in the composite particles of this embodiment has a Si content of usually not less than 0.1 wt %, preferably not less than 0.5 wt %, but usually 23 wt % or less, preferably 20 wt % or less, in terms of $SiO_2$ with respect to the total weight of the composite particles. The Si content with respect to the total weight of the composite particles will be described in the section below where the coating amount of the composite particles is described.

By incorporating the component having a three-dimensional siloxane crosslinked structure into the composite particles in the above-described range, the rate of initial dissolution of the PVA-based resin contained in the composite particles into water is limited, so that the particles can be dispersed in water before an adhesive layer of the resin component dissolved at a high concentration is formed on the surfaces of wetted particles. Further, when the siloxane crosslinked structure exists on the composite particle surfaces as a $SiO_2$ layer, adhesion of wet particles is less likely to occur, which is preferred. Consequently, agglomeration and lump generation can be suppressed without largely modifying the molecular structure and formulation of the PVA-based resin component to be used, and clogging of a flow path caused by swollen and agglomerated particles as well as adhesion of such particles to a stirring blade can be reduced, which are preferred.

As the surfaces of the composite particles are sufficiently hydrated and swelling and elution of the PVA-based resin component contained in the composite particles proceed, a coating film or network structure formed by the component having a three-dimensional siloxane crosslinked structure is stretched and partially cut or broken, as a result of which the resin component starts to actively elute from the defective part. Therefore, the PVA-based resin component contained in the composite particles can be eventually completely dissolved in water.

In an aqueous solution obtained after the dissolution of the PVA-based resin, a silica component derived from the three-dimensional siloxane crosslinked structure remains as an insoluble component, however, since the silica component is colorless and the amount thereof is extremely small, it does not affect the viscosity of the aqueous solution, the coloration and durability of the resulting composition, and the like. Moreover, in an application where an increase in the amount of the insoluble component does not present any problem, it is also possible to introduce the silica component more aggressively and to control the dissolution amount and residual amount thereof independently from the performance provided by the original molecular structure and particle size.

The presence or absence of the component having a three-dimensional siloxane crosslinked structure in the composite particles can be confirmed by, for example, solid $^{29}$Si-NMR spectrometry (nuclear magnetic resonance spectrometry).

When the component having a three-dimensional siloxane crosslinked structure is present, broad peaks attributed to a crosslinked product of a trifunctional silicon unit directly bound with a carbon atom of an organic group R (T unit: $RSiO_{1.5}$) and/or a tetrafunctional silicon unit that is not bound with any carbon atom of an organic group (Q unit: $SiO_2$) are observed in the solid $^{29}$Si-NMR spectrometry.

As a sample for the solid $^{29}$Si-NMR spectrometry, the composite particles themselves that contain the component having a three-dimensional siloxane crosslinked structure may be used, or a gel-form silica residue remaining after completely dissolving the PVA-based resin contained in the composite particles into water, which residue is recovered by filtration and centrifugation and subsequently dried, may be used as the sample. Further, when the composite particles have a structure in which the PVA-based resin is coated with the above-described $SiO_2$ layer or a hybrid film, the $SiO_2$ layer or the hybrid film may be recovered by peeling and used as the sample, or a shell-form or gel-form silica residue remaining after completely dissolving the PVA-based resin contained in the composite particles into water, which residue is recovered by filtration and centrifugation and subsequently dried, can be used as the sample.

(3) Other Components

The composite particles of this embodiment comprise the PVA-based resin and the component having a three-dimensional siloxane crosslinked structure that is derived from a hydrolysis-polycondensation product of an alkoxysilane and/or a low condensate thereof, and may also contain other component(s) in the composite particles and/or powder thereof. In other words, the other component(s) may be internally and/or externally added to the composite particles.

Examples of the other component(s) include a bulking agent, an antifoaming agent, a release agent, a UV curing agent, a viscosity modifier, a colorant, an antioxidant, and additives having other functions. When these components are incorporated, the amount thereof in the composite particles and/or powder thereof is usually not less than 0.01 wt %, preferably not less than 0.1 wt %, but usually 5 wt % or less, preferably 3 wt % or less. Further, as required, a water-soluble resin, such as an ordinary PVA, starch or carboxymethyl cellulose, may also be admixed within a range that does not impair the properties of the composite particles and/or powder thereof.

For example, a hybrid film that contains a component having a siloxane crosslinked structure and a water-soluble resin may be provided on the surfaces of the composite particles. By changing the ratio of the component having a siloxane crosslinked structure and the water-soluble resin and/or the type of the water-soluble resin, the effect of suppressing initial dissolution and swelling can be attained at a level conforming to the intended use.

(4) Composite Particles

In the composite particles of this embodiment, a composite is formed by the PVA-based resin and the component having a three-dimensional siloxane crosslinked structure. The composite may be in a state where these components are bound with each other via some kind of chemical bond, or may be in a state where these components physically coexist in a simple manner.

In one mode, the composite particles have a structure in which particles of the PVA-based resin serve as nuclei and are each coated with a $SiO_2$ layer having the three-dimensional siloxane crosslinked structure. In this case, the $SiO_2$ layer may cover only a part of or the entirety of the surface of each PVA-based resin particle. The coating amount is preferably not less than 0.1 wt %, more preferably not less than 0.5 wt %, in terms of $SiO_2$ with respect to the amount of the PVA-based resin constituting the nuclei in the composite particles.

The coating amount can be calculated from the weight ratio of a coating liquid and the PVA-based resin particles if the Si content of the coating liquid in terms of $SiO_2$ is known. When the interface between the $SiO_2$ layer and each PVA-based resin particle is clear, the coating amount can be calculated by an image analysis after observing cross-sections of the composite particles under an SEM and confirming that their coating layers contain Si by elemental mapping. Meanwhile, when the interface between the $SiO_2$ layer and each PVA-based resin particle is not clear, the composite particles can be fired at 800° C. to 1,000° C., and the coating amount in terms of $SiO_2$ can be determined from the weight of the resulting firing residue. For inorganic filler-containing particles and the like, the $SiO_2$ content attributed to coating films can be determined by complementarily combining an elemental analysis of the firing residue and an image analysis of cross-sections of the composite particles. Whether the contained silicon has a T unit and/or a Q unit can be determined by solid $^{29}$Si-nuclear magnetic resonance spectroscopy.

In cases where the three-dimensional siloxane crosslinked structure is derived from a tetraalkoxysilane, the refractive index of the PVA-based resin is usually different from that of $SiO_2$, therefore, when the particles swollen in water are visually observed, those parts having a large amount of a $SiO_2$ component derived from the three-dimensional siloxane crosslinked structure appear to be highly turbid. In this mode, $SiO_2$ layers derived from the three-dimensional siloxane crosslinked structure appear to be adhered to the translucent particle surfaces in the form of white thin shells. Further, flake-form shell fragments remain after the PVA-based resin component is dissolved. When the coating amount is small, there are cases where the $SiO_2$ coating layers are not clearly visible and the entirety of the particles (PVA-based resin particles) appear in milky-white.

In another mode, the composite particles have a structure in which particles of the PVA-based resin serve as nuclei and are each coated with a hybrid film that contains the component having a three-dimensional siloxane crosslinked structure and a water-soluble resin, instead of being coated with the above-described $SiO_2$ layer. In this case, the hybrid film covers the PVA-based resin particles in the composite particles in an amount of not less than 0.1 wt %, more preferably not less than 0.5 wt %, in terms of the solid component of the hybrid film. The Si content in the solid component of the hybrid film is preferably 15 wt % or more and less than 100 wt % in terms of $SiO_2$.

In yet another mode, the component having a three-dimensional siloxane crosslinked structure exists in the vicinity of the surface inside the PVA-based resin particles. In this constitution, the component having a three-dimensional siloxane crosslinked structure may be present or absent in those parts other than the vicinity of the surface as long as the component having a three-dimensional siloxane crosslinked structure exists in the vicinity of the surface inside the PVA-based resin particles, however, it is preferred that the component having a three-dimensional siloxane crosslinked structure exist locally in the vicinity of the surface. The term "the vicinity of the surface" used herein refers to a region that is not less than 50% away from the center toward the surface with respect to the diameter of each resin particle, and may be a region that is preferably not less than 60%, more preferably not less than 70%, particularly preferably not less than 75% away from the center toward the surface. In this case, the surfaces of the PVA-based resin particles may be entirely or partially coated with the component having a three-dimensional siloxane crosslinked structure, and some parts of the surfaces are not required to be coated, however, the PVA-based resin particles are usually in a state where their surfaces are entirely coated. This mode has an advantage in that, even when a formulation that is likely to cause cracking and defects is selected for the $SiO_2$ layer or the hybrid film, initial dissolution and swelling of the exposed surfaces of the PVA-based resin particles can be suppressed to a certain extent.

In cases where the three-dimensional siloxane crosslinked structure is derived from a tetraalkoxysilane, the vicinity of the surface inside the particles (PVA-based resin particles) of this mode appears to be highly turbid while the vicinity of the center appears to be slightly transparent, when the particles swollen in water are visually observed. Whether or not the component having the three-dimensional siloxane crosslinked structure exists in the vicinity of the surface inside the PVA-based resin particles can also be confirmed by performing an SEM-EDX analysis of the PVA-based resin particles and checking the distribution of Si atoms.

The composite particles of this mode are formed by, for example, as described below, allowing a portion of a coating liquid containing a hydrolysis-polycondensation product of an alkoxysilane and/or a low condensate thereof to infiltrate into the surfaces of the PVA-based resin particles at the time of performing a coating treatment. The liquid that is allowed to infiltrate may be a coating liquid, or a liquid that is separately prepared.

In yet another mode, the component having a three-dimensional siloxane crosslinked structure uniformly exists inside the PVA-based resin particles. The term "uniformly" used herein, which is not required to signify strict uniformity, means that the component having a three-dimensional siloxane crosslinked structure exists in substantially the entire region inside the PVA-based resin particles. For example, the component having a three-dimensional siloxane crosslinked structure may exist in not less than 75%, preferably not less than 80%, more preferably not less than 90%, particularly preferably the entirety, of the region. In this mode, since dissolution and swelling of the PVA-based resin can be suppressed by a means other than controlling the molecular structure of the PVA-based resin, there is an advantage that the degree of freedom in selecting the resin is high.

In cases where the three-dimensional siloxane crosslinked structure is derived from a tetraalkoxysilane, the particles (PVA-based resin particles) of this mode entirely appear in milky white when the particles swollen in water are visually observed. Whether or not the component having the three-dimensional siloxane crosslinked structure exists in the vicinity of the surface inside the PVA-based resin particles can also be confirmed by performing an SEM-EDX analysis of the PVA-based resin particles and checking the distribution of Si atoms.

The composite particles of this mode can be formed by, for example, as described below, heat-drying a homogeneous mixture of an aqueous PVA-based resin solution and a silicate hydrolysis solution into particles.

In yet another mode, the composite particles may have a Si—O—C structure that is formed by a reaction between a hydroxy group of the PVA-based resin and a hydroxy group bonded to silicon (silanol group) of a hydrolysis-polycondensation product of an alkoxysilane and/or a low condensate thereof.

It is noted here that the presence of a three-dimensional siloxane crosslinked structure in the above-described composite particles can be confirmed by $^{29}$Si-nuclear magnetic resonance spectroscopy, and the presence of a Si—O—C structure can be confirmed by $^{29}$Si-nuclear magnetic resonance spectroscopy or $^1$H-nuclear magnetic resonance spectroscopy.

The composite particles of this embodiment may have any particle size depending on the purpose thereof, however, the average particle size (d50) is usually 1 µm to 3,000 µm. The average particle size (d50) is preferably not smaller than 10 µm, more preferably not smaller than 50 µm, particularly preferably not smaller than 300 µm, but preferably 2,000 µm or smaller, more preferably 1,000 µm or smaller.

The average particle size can be measured using a laser diffraction-type particle size distribution analyzer.

It is noted here however that, since the present invention is applicable to an extremely wide range with regard to the particle size of the composite particles, it is also possible to, for convenience, roughly estimate the average particle size from the weight ratio of particles using a multi-stage sieve.

Examples of the shape of the composite particles include, but not particularly limited to, a granular shape and/or a pearl shape in the case of powder; and a cylindrical shape, a spherical shape, or the like in the case of a pellet.

A method of obtaining the composite particles of this embodiment is not particularly limited, and the composite particles of this embodiment can be obtained by, for example, any of the below-described methods. It is noted here that a PVA-based resin is used in the below-described methods. A PVA-based resin is one example of most preferred materials in the present invention and, in the constitution of the present invention, the central part is not particularly limited especially in the methods (i) and (iii) as long as it is soluble in water. For example, a mixture of a PVA resin and other resin can be applied as well.

(i) A production method based on silica coating (ii) A production method based on homogeneous mixing of an aqueous PVA-based resin solution and a silicate hydrolysis solution (iii) A production method based on hybrid coating in which PVA-based resin particles are coated with a homogeneous mixture of a water-soluble resin solution and a silicate hydrolysis solution The composite particles based on (i) silica coating are produced by surface-treating PVA-based resin particles with a liquid (coating liquid) that contains a hydrolysis-polycondensation product of an alkoxysilane and/or a low condensate thereof along with a diluting solvent, and a component having a three-dimensional siloxane crosslinked structure exists mainly on the surfaces of the PVA-based resin particles. When the PVA-based resin has a molecular structure that is readily swollen with water and the solvent, there are cases where the coating liquid permeates into the resin particles and a three-dimensional siloxane structure is also formed in the vicinity of the inner surfaces of the resin particles.

In contrast, the composite particles based on (ii) are produced by once dissolving PVA-based resin particles into water, mixing the resultant with an aqueous hydrolysate solution of an alkoxysilane and/or a low condensate thereof, subsequently heat-drying the thus obtained mixture and then once again making the thus heat-dried product into particles, and a component having a three-dimensional siloxane crosslinked structure exists throughout the inside of the composite particles.

The composite particles based on (iii) hybrid coating are produced by treating PVA-based resin particles with a homogeneous mixture (coating liquid) of a water-soluble resin solution and a silicate hydrolysis solution, and the resulting hybrid film contains the water-soluble resin along with a component having a three-dimensional siloxane crosslinked structure. These methods of (i), (ii) and (iii) can be performed individually or in combination.

The (i) production method based on silica coating will now be described in detail.

The term "silica coating" used herein refers to a method of coating the particle surface with a coating liquid that contains a hydrolysis-polycondensation product of an alkoxysilane and/or a low condensate thereof, and examples thereof include the following methods a) to c).

a) In a coating liquid prepared in advance by hydrolysis-polycondensation and aging of an alkoxysilane and/or a low condensate thereof in a solvent, PVA-based resin particles are immersed, and the resulting supernatant is subsequently removed by filtration or decantation as required, followed by heat-drying of the particles to which a liquid-form hydrolysis-polycondensation product has been adhered.

b) A coating liquid prepared in advance by hydrolysis-polycondensation and aging of an alkoxysilane and/or a low condensate thereof in a solvent is sprayed or applied dropwise onto PVA-based resin particles so as allow a liquid-form hydrolysis-polycondensation product to adhere to the surfaces of the particles, followed by heat-drying of the resultant.

c) After immersing PVA-based resin particles in a hydrophilic solvent containing water and a catalyst for hydrolysis, a solvent-diluted solution of an alkoxysilane and/or a low condensate thereof is added dropwise thereto to perform hydrolysis and polycondensation. In the resulting liquid phase, a silica film is allowed to precipitate on the surfaces of the resin particles serving as nuclei, after which the particles are separated from the liquid phase and then heat-dried.

It is noted here that, in the case of forming a coating layer that contains other component(s), a liquid prepared by dissolving or dispersing the other component(s) in a coating liquid may be used.

In the methods of a) and b), to the alkoxysilane and/or low condensate thereof that have been dissolved in a water-miscible solvent in advance, water is added in at least an amount that can theoretically hydrolyze 100% of the alkoxysilane and/or low condensate thereof. In this process, a solvent other than water may be present and, as the solvent, an alcohol, a glycol derivative, a hydrocarbon, an ester, a ketone or an ether may be used individually, or two or more of these solvents may be used as a mixture. Any of these solvents can be used, however, an alcohol is preferred from the standpoints of the ease of handling, the liquid storage stability and the like. Particularly, by using methanol or ethanol, a silica coating film having a high density and excellent adhesion can be formed on the surfaces of the resin particles.

The amount of the solvent to be added is preferably 50 parts to 2,000 parts by weight, more preferably 100 parts to 1,000 parts by weight, with respect to 100 parts by weight of the alkoxysilane and/or low condensate thereof. By adding the solvent in an amount of 50 parts by weight or greater, not only the storage stability of the coating liquid is improved, the coating liquid is made less likely to be gelled, but also homogeneous mixing with the resin particles is achieved. Further, by adding the solvent in an amount of 2,000 parts by weight or less, a silica coating film can be easily formed on the surfaces of the resin particles at a sufficient thickness.

In the method of a) and b), a catalyst for hydrolysis and polycondensation may be further added as required. Examples of the catalyst include inorganic acids: organic acids; alkaline catalysts; organic metals; metal alkoxides; organotin compounds; metal chelate compounds containing any one of metals such as aluminum, titanium and zirconium; and boron compounds. From the standpoint of attaining excellent storage stability of the resulting coating agent and excellent properties of the resulting silica coating film, it is preferred to use one or more of organic acids such as maleic acid; metal chelate compounds such as aluminum tris(acetylacetonate); metal alkoxides; and boron compounds.

The amount of these catalyst components to be added is not particularly limited as long as it is such an amount that allows the catalysts to exert their functions, however, the amount is usually selected to be in a range of 0.1 parts to 10 parts by weight or so, preferably 0.5 parts to 5 parts by weight, with respect to 100 parts by weight of the alkoxysilane and/or low condensate thereof.

Moreover, the amount of water to be added is usually 0.8 mol % to 2 mol %, preferably 1 mol % to 1.5 mol %, with respect to the total amount of alkoxy groups contained in the alkoxysilane and/or low condensate thereof. By adding water in such an amount, not only the hydrolysis reaction is easily allowed to proceed properly but also the formation of a porous structure caused by an excessively high hydrolysis reaction rate is made less likely to occur, so that the effects of suppressing initial dissolution and swelling of the PVA-based resin component are likely to be attained.

Further, in the methods of a) and b), a blended liquid obtained by blending the above-described components is allowed to age. By performing such an aging step, hydrolysis of the alkoxysilane as well as partial crosslinking reaction of the alkoxysilane through condensation proceed sufficiently, so that a silica coating film having excellent adhesiveness with raw material powder can be obtained. The aging temperature may be room temperature, however, the aging may be accelerated as appropriate by heating the blended liquid at a temperature of not higher than the boiling point of the solvent.

In the method of c), the step of hydrolyzing and dehydration-polymerizing the alkoxysilane and/or low condensate thereof is performed at a low ambient temperature of 0° C. to 20° C. As a result, a uniform and continuous coating film can be formed on the surfaces of the resin particles. The liquid temperature is preferably 0° C. or higher, more preferably 5° C. or higher, but preferably not higher than 10° C. As a solvent, any of the above-described solvents can be used, however, thereamong, methanol or ethanol is preferred, and the solvent is added in an amount of 200 parts by weight or greater, preferably 400 parts by weight or greater, with respect to 100 parts by weight of the alkoxysilane and/or low condensate thereof. When the amount of the solvent is excessively small, spherical silica is mainly generated instead of a silica coating film, therefore, a continuous coating film having a sufficient thickness cannot be formed on the surfaces of the resin particles, and the effects of suppressing initial dissolution and swelling of the PVA-based resin component may thus be insufficient. As a catalyst for the hydrolysis reaction, for example, aqueous ammonia can be used. After the reaction, the resulting mixed solution is left to stand, and spherical silica particles and the like not yielding a coating film are removed with the whole supernatant by decantation, after which solid-liquid separation is performed as required by filtration and centrifugation, followed by reduced-pressure drying or heat-drying of the resulting resin particles having a silica coating film.

In the (ii) production method based on homogeneous mixing of an aqueous PVA-based resin solution and a silicate hydrolysis solution, composite particles are obtained through the following steps 1) to 5):

1) preparation of an aqueous silicate solution (A);
2) preparation of an aqueous PVA-based resin solution (B);
3) mixing of (A) and (B);
4) solvent removal and extraction of composite particles; and
5) heat-drying.

1) Preparation of Aqueous Silicate Solution (A)

In this step, in the presence or absence of a solvent, an alkoxysilane and/or a low condensate thereof is mixed with a catalyst and water and thereby hydrolyzed to obtain a liquid hydrolysate composition that can be arbitrarily diluted with water.

As the solvent, an aliphatic lower alcohol having 1 to 4 carbon atoms, such as methanol, ethanol or propanol, is usually used, however, methanol or ethanol, which is highly compatible with water and is unlikely to cause PVA to precipitate even when mixed with an aqueous PVA-based resin solution, is particularly preferred. The alkoxysilane and/or low condensate thereof and the hydrolysis water are not compatible with each other when they are mixed in the absence of a solvent, however, since the added water is consumed as the hydrolysis proceeds and a corresponding alcohol is consequently generated, a homogeneous and transparent composition can be eventually obtained even in the absence of a solvent when the amount of the added water is small. The amount of the solvent to be used is 30 parts by weight or less, preferably 20 parts by weight or less, with respect to 100 parts by weight of the water contained in the mixture of (A) and (B), and the lower limit thereof is 0 part by weight. Subsequently, as required, the resultant may be diluted with water to a desired concentration.

In order to perform hydrolysis (and/or condensation) of the alkoxysilane and/or low condensate thereof in the preparation of the (A), a catalyst and water are used. Examples of the catalyst usually include inorganic acid catalysts such as hydrochloric acid, sulfuric acid, nitric acid, and hydrofluoric acid; organic acid catalysts such as formic acid, acetic acid, maleic acid, fumaric acid, and p-toluenesulfonic acid; base catalysts such as ammonia; organic metals; metal alkoxides; organotin compounds; metal chelate compounds containing any one of metals such as aluminum, titanium and zirconium; and boron compounds. From the standpoint of allowing the resulting hydrolysate to contain a large number of silanol groups and have a high affinity for water and PVA resins and allowing the (A) to have excellent storage stability by making it unlikely to be gelled in a short time, the solvent is preferably, for example, an acid catalyst, an organic metal, a metal alkoxide, a metal chelate compound, or a boron compound.

The amount of the catalyst is usually 0.001 mol % to 0.3 mol %, preferably 0.002 mol % to 0.2 mol %, particularly preferably 0.003 mol % to 0.1 mol %, with respect to the total molar amount of alkoxy groups in the alkoxysilane and/or low condensate thereof. By using the catalyst in such an amount, the hydrolysis reaction proceeds at an appropriate rate, and the storage stability of the (A) is improved.

Further, the amount of water used in the preparation of the (A) is usually 50 mol % to 200 mol %, preferably 55 mol % to 180 mol %, with respect to the total alkoxy group amount in the alkoxysilane and/or low condensate thereof. By using water in such an amount, the progress of the hydrolysis reaction is facilitated, and the (A) is made likely to be homogeneously dissolved with water when diluted with water. Moreover, the desired composite is prevented from being porous at the time of extraction, and the drying thereof does not require unnecessary calories. Usually, a mixture of the catalyst and water is added to the alkoxysilane and/or low condensate thereof at once, however, the catalyst and water may be added separately as well.

In the preparation of the (A), the hydrolysis (and/or condensation) reaction of the alkoxysilane and/or low condensate thereof is usually performed at 10° C. to 80° C. When this temperature is excessively high, the hydrolysis reaction rate is high and the (A) is likely to be gelled, whereas an excessively low temperature tends to make the reaction less likely to proceed. The reaction is usually performed with stirring.

The reaction time varies depending on the scale, however, it is usually 5 minutes to 24 hours, preferably 10 minutes to 8 hours. By setting the reaction time in this range, the (A) is made unlikely to have a high viscosity or be gelled and the reaction is prevented from being insufficient, so that the (A) and the (B) are easily transparently dissolved together.

2) Preparation of Aqueous PVA-Based Resin Solution (B)

In this step, PVA-based resin particles are added to water, or heated water as required, with stirring to dissolve the resin particles into water, whereby an aqueous PVA-based resin solution (B) is prepared. The water temperature is 10° C. to 100° C., particularly preferably 25° C. to 90° C., and it is selected as appropriate in accordance with the dissolution characteristics. The PVA-based resin particles may be added at once or in portions. After the completion of the addition, in order to inhibit lump formation and completely dissolve the PVA-based resin particles, the resulting solution may be heated as required. Alternatively, the PVA-based resin particles may be added with heating.

The concentration of the thus obtained aqueous solution can be selected as appropriate in accordance with the viscosity of the (B), the dissolution characteristics of the resin being used, and the compatibility of the resin with the (A), and it is usually 1 wt % to 30 wt %, preferably 2 wt % to 25 wt %. The solvent of the solution (B) is usually water, however, the solution (B) may also contain an organic solvent, such as a lower alcohol having 1 to 3 carbon atoms or acetone, within a range that does not adversely affect the effects of the present invention (e.g., 10 wt % or less).

3) Mixing of (A) and (B)

In this step, the (A) and the (B) prepared by the above-described respective methods are mixed to obtain a homogeneous aqueous solution.

When the alkoxysilane and/or low condensate thereof contained in the (A) is/are in a partially hydrolyzed state, water in the (B) is partially utilized for hydrolysis of the silicate component at the time of mixing the (A) and the (B), and hydrolysis and polycondensation thereby further proceed. After the mixing of the (A) and the (B), as required, the resulting mixture is aged for 10 minutes to 24 hours at room temperature or with heating at a temperature of not higher than the boiling point of the mixture, whereby a homogeneous aqueous solution is obtained.

4) Solvent Removal and Extraction of Composite Particles

In this step, solvents are removed from the homogeneous aqueous solution obtained in the previous step, and composite particles having a desired particle size range are extracted. For example, any of the following methods (a) to (c) can be arbitrarily selected in accordance with the system.

(a) A method of drying the mixture of the (A) and the (B) to such an extent that the resultant can be pulverized, and subsequently pulverizing the thus obtained solid using a pulverizer, such as a roller mill, a jet mill, a high-speed rotary pulverizer, or a container driving-type mill.

(b) A method of mixing the mixture of the (A) and the (B) with a poor solvent to allow composite particles to precipitate, collecting the particles by filtration or decantation, and then drying the thus recovered particles.

(c) A method of spray-drying the mixture of the (A) and the (B) to perform granulation and drying of the mixture simultaneously.

In the step of drying the composite particles, dehydration-condensation takes place between silanol groups or between hydroxy groups of the PVA-based resin and silanol groups, and the strength of the composite is thus gradually increased, therefore, in the case of performing pulverization, by setting the preliminary drying conditions in the previous step to be of low-temperature and reduced-pressure drying or high-temperature and normal-pressure short-term drying, the pulverization in the subsequent step can be easily performed.

5) Heat-Drying

The composite particles obtained by one of the methods (a) to (c) are heat-dried to a constant weight under reduced pressure or normal pressure in a temperature range of 90° C. to 150° C., preferably 100° C. to 140° C., for 1 hour to 10 hours. The heat-drying can be performed in the steps of (a) to (c) as well. By drying the composite particles in this temperature range, the dehydration-condensation between silanol groups or between hydroxy groups of the PVA-based resin and silanol groups is facilitated, so that a stronger three-dimensional siloxane crosslinked structure is formed, and at least some of the hydroxy groups of the PVA-based resin are bound with the three-dimensional siloxane crosslinked structure. The higher the drying temperature, the more facilitated is the dehydration-polycondensation, however, the upper limit temperature is selected as appropriate in accordance with the properties of the PVA-based resin being used, such as melting point and glass transition temperature.

In the (iii) composite particle production method based on hybrid coating, composite particles are obtained through the following steps 1) to 5):

1) preparation of an aqueous silicate solution (A);
2) preparation of a water-soluble resin solution (B);
3) mixing of (A) and (B) (preparation of a coating liquid);
4) coating treatment of PVA-based resin particles; and
5) heat-drying.

The water-soluble resin for the formation of a hybrid film may be any of known water-soluble resins. Thereamong, a water-soluble resin having a lower solubility in water at 23° C. than the PVA-based resin particles to be coated is preferred, however, even when the water-soluble resin has a higher solubility, by allowing a component having a siloxane crosslinked structure to coexist, a film having a lower solubility than the PVA-based resin particles can be obtained as a hybrid film. As the water-soluble resin, a polyvinyl alcohol-based resin is particularly preferred since it has excellent film-forming properties and a high degree of freedom in molecular design and imposes a low environmental load. The above-described steps of 1) to 3) can be performed in the same manner as the steps 1) to 3) of the above-described production method of (ii).

4) Coating Treatment of PVA-Based Resin Particles

In this step, a coating liquid prepared in 3) is sprayed or dropped onto PVA-based resin particles to adhere the coating liquid to the particle surfaces. In order to allow the PVA-based resin particles to be dissolved in the water-containing coating liquid and to maintain the form of discrete particles without fusing together, the amount of the coating liquid to be used is preferably the smallest amount possible that can wet the entire surfaces of the PVA-based resin particles.

5) Heat-Drying

In this step, in order to inhibit adhesion of the particles, heat-drying is performed while crushing and stirring the particles to such an extent that can prevent the resulting coating layer from being defective. Normal-temperature drying and reduced-pressure drying can both be performed, and the heat-drying can be performed at a temperature of 90° C. or higher, preferably 100° C. or higher, but 150° C. or lower, preferably 140° C. or lower, when the drying is performed under normal pressure, or at a temperature of 40° C. or higher, preferably 50° C. or higher, but 130° C. or lower, preferably 120° C. or lower, when the drying is performed under reduced pressure.

In the composite particles of this embodiment, a component having a three-dimensional siloxane crosslinked structure exists on the surfaces of the particles and/or inside of the particles. Further, at least some of the hydroxy groups of the PVA-based resin can be bonded to the silanol groups contained in the three-dimensional siloxane crosslinked structure by dehydration-condensation. As a result, the PVA-based resin molecules contained in the composite particles are limited in terms of free contact with water and elution, and effects of suppressing initial dissolution and suppressing swelling are exerted. Accordingly, in the composite particle powder added to water, dissolution of the surface layer and swelling are unlikely to occur before the powder is dispersed in water in the form of individual particles, and the particles do not adhere with each other.

In this manner, when an aqueous solution is prepared using the composite particles of this embodiment, generation of lumps does not occur, therefore, the composite particles can be promptly dissolved, and an aqueous solution can thus be produced easily.

In the composite particles of this embodiment, initial dissolution of the PVA-based resin can be suppressed, and the dispersibility of the PVA-based resin after the addition of the composite particles to water can be improved. Specifically, when 1 part by weight of the composite particles is homogeneously dispersed in 100 parts by weight of water at room temperature and subsequently left to stand and settle for 6 hours, the residual rate of the composite particles is 1.03 times or higher, preferably 1.1 times or higher, more preferably 2.0 times or higher, but 250 times or lower, preferably 10 times or lower, more preferably 7 times or lower, with respect to the residual rate of corresponding PVA-based resin particles that do not contain a component having a three-dimensional siloxane crosslinked structure but have an average particle size equivalent to that of the composite particles. With the ratio of the residual rates being in this range, good initial dissolution-suppressing effect at room temperature is attained while excessive suppression of dissolution can be avoided, so that the composite particles can be dissolved in water in a short time. In cases where a PVA-based resin that makes the ratio of the residual rates be lower than 1.03 is used in order to obtain composite particles that hardly dissolve at room temperature, the same comparison is made under the dissolution conditions recommended for the PVA-based resin. An appropriate target value of the residual rate varies depending on the intended use of the composite particles, however, it can be arbitrarily controlled by modifying the coating amount and the content of the component having a three-dimensional siloxane crosslinked structure.

Moreover, in cases where the composite particles of this embodiment are applied to PVA-based resin particles that have a low solubility in water and exhibit prominent swelling, the initial swelling is suppressed, so that the composite particles, when added to water, rarely cause either of pipe clogging during slurry transfer and a defect in stirring/handling, which occur due to unwanted swelling. In the present invention, the initial swelling degree of the composite particles is lower than the swelling degree of PVA-based resin particles that do not contain a component having a three-dimensional siloxane crosslinked structure but have an average particle size equivalent to that of the composite particles in the same time period.

In the present invention, the swelling degree of composite particles is represented by the following formula (I). In formula (I), even when the composite particles are partially dissolved, the dry weight of the composite particles remaining undissolved after absorption of water is defined as the denominator "Dry weight of composite particles after water absorption". Alternatively, when the dissolution of the resin is negligible, the swelling degree of the composite particles can be calculated as a volume ratio of the composite particles before and after swelling, rather than using formula (I).

$$\text{Swelling degree (\%)} = (\text{Weight of composite particles after water absorption}/\text{Dry weight of composite particles after water absorption}) \times 100 \quad (I)$$

As for the measurement conditions of this formula (I), the swelling degree is measured when 1 part by weight of the composite particles is homogeneously dispersed in 100 parts by weight of water at room temperature (23° C.) and subsequently left to stand and settle for 3 hours. The composite particles of the present invention can be confirmed to have an appropriate coating amount when this value is 0.9 times of less, preferably 0.8 times or less, more preferably 0.5 times or less, but 0.005 times or higher, preferably 0.01 times or higher, more preferably 0.1 times or higher, with respect to the swelling degree of a PVA-based resin particle that does not contain a component having a three-dimensional siloxane crosslinked structure but has an equivalent particle size. By controlling the ratio of swelling degree within this range, swelling can be appropriately suppressed, and desired dissolution and swelling operations can be completed in a short time. Moreover, a sufficient swelling-suppressing effect can be observed at room temperature. An appropriate target value of the ratio of swelling degree varies depending on the intended use of the composite particles, however, it can be arbitrarily controlled by modifying the coating amount and the amount of the component having a three-dimensional siloxane crosslinked structure to be introduced.

<Fracture Plugging Method Using Diverting Agent>

The organic-inorganic composite particles according to one embodiment of the present invention can be used in a diverting agent. A diverting agent containing the organic-inorganic composite particles can be used in, for example, a drilling method based on a hydraulic fracturing process.

This drilling method includes the step of filling some of fractures formed in a well wall with the diverting agent containing the organic-inorganic composite particles according to this embodiment and thereby temporarily sealing the fractures.

In a hydraulic fracturing process, for example, a well formed by drilling with a drill or the like is filled with a fluid. Next, preliminary blasting is performed in the well to form relatively large fractures and also numerous small fractures in the well wall. Then, the fluid is pressure-injected into the well to allow the fluid to flow into the fractures and to thereby apply a load to the fractures, whereby the fractures are grown into a size suitable for resource extraction. Thereafter, an underground resource is extracted through the fractures.

The diverting agent containing the organic-inorganic composite particles according to this embodiment is filled into some of the fractures formed in the well wall by the preliminary blasting, particularly the small fractures. By pressure-injecting the fluid into the well in this state, the fluid infiltrates into other fractures, allowing these other fractures to grow. As a result, large fractures can be formed effectively. Moreover, from such a well having large fractures, an underground resource can be efficiently extracted by performing hydraulic fracturing. It is preferred that, after the hydraulic fracturing, the composite particles be dissolved by the ground heat and discharged from the filled fractures. The underground resource to be extracted is not particularly limited, and examples thereof include petroleum, natural gas, and shale gas.

<Lost Circulation Preventing Method Using Loss Circulation Material>

The organic-inorganic composite particles according to one embodiment of the present invention can be used in a lost circulation material. A lost circulation material containing the organic-inorganic composite particles can be used in, for example, a drilling method based on a slurry process.

This drilling method includes the step of preventing lost circulation of drilling mud by filling some of fractures formed in a well wall with the lost circulation material containing the organic-inorganic composite particles according to this embodiment and swelling the composite particles with water.

In a slurry process, for example, in the step of forming a well by drilling with a drill or the like, a slurry is circulated so as to, for example, inhibit blowout by removing cuttings from the bottom of the well and the periphery of the drill or the like, bringing up the cuttings above ground, cooling the drill or the like to impart lubricity thereto, and reducing the underground pressure. In this process, when the slurry escapes through the well wall during drilling or through fractures and the like existing in the well wall (lost circulation), there is a risk of causing the well wall and the wellbore to collapse and inducing unexpected infiltration of formation fluid. The lost circulation material containing the organic-inorganic composite particles according to this embodiment is capable of plugging the well wall and thereby preventing lost circulation. The lost circulation material may be blended into the slurry in advance, or may be fed to the slurry in the vicinity of the ground where lost circulation is likely to occur.

The underground resource to be extracted is not particularly limited, and examples thereof include petroleum, natural gas, and shale gas.

In the above-described manner, the organic-inorganic composite particles according to one embodiment of the present invention are capable of temporarily sealing fractures of a well wall to plug the fractures and filling the fractures of the well wall to prevent lost circulation of drilling mud. In addition, after achieving these objects, the composite particles are entirely dissolved because of the water solubility of the PVA-based resin and subsequently degraded by organisms, leaving only silica that is substantially sand, therefore, the composite particles have a low environmental impact.

EXAMPLES

The present invention will now be described in more detail by way of examples thereof. It is noted here that "room temperature" represents 23° C. unless otherwise specified.

Example 1

<Coating of Component Having Three-Dimensional Siloxane Structure Using PVA-Based Resin as Nucleus>

(Preparation of Coating Liquid)

First, 62.39 parts by weight of methanol was added to 30.80 parts by weight of a tetramethoxysilane oligomer (methyl silicate) having a weight-average molecular weight of 550, a silica content of 52 wt % in terms of $SiO_2$ and a tetramethoxysilane content of 0.2 wt % or less, and 0.31 parts by weight acetylacetone aluminum salt powder was further added thereto, after which these materials were stirred and homogeneously dissolved at room temperature. Subsequently, 6.50 parts by weight of desalted water was added, and the resultant was stirred to homogeneity and then left to stand and aged for 3 days at room temperature in a hermetically closed vessel so as to allow hydrolysis and polycondensation to proceed, whereby 100 parts by weight of a silicate hydrolysis solution having a silica content of 16 wt % in terms of $SiO_2$ was obtained. In a separate vessel, 20.6 parts by weight of the thus obtained silicate hydrolysis solution was weighed and diluted with addition of 17.9 parts by weight of methanol for dilution, whereby a colorless and transparent coating liquid was obtained.

(Coating Treatment of PVA-Based Resin Particles with Component Having Three-Dimensional Siloxane Structure)

PVA-based resin particles A to C, which were made of modified PVAs having the basic structural units represented by formulae (1a) to (1c) below and a 1,2-diol structural unit in a side chain, were prepared. The physical properties of these resin particles A to C are shown in Table 1. For these resin particles A to C, the PVA-based resin surface was coated with a component having a three-dimensional siloxane structure (hereinafter, may be simply referred to as "silica coating") The average particle sizes of the thus obtained composite particles were measured using an electromagnetic vibration-type sieving apparatus. The measurement was performed using RETSCH AS200 as a vibrator for a sieving time of 30 minutes at an amplitude of 2 mm.

(1 a)

(1 b)

(1 c)

Average polymerization degree: measured in accordance with JIS K 6726

Side-chain 1,2-diol structural unit content: measured by $^1$H-NMR (400 MHz, proton NMR, solvent: deuterium oxide, temperature: 50° C.) and calculated from an integral value based on the thus obtained NMR chart $((1c)/((1a)+(1b)+(1c)))\times 100$ (mol %)

Saponification degree: measured in accordance with JIS K 6726

TABLE 1

| Resin | A | B | C |
|---|---|---|---|
| Average particle size (μm) | 300 | 300 | 500 |
| Average polymerization degree | 300 | 1,200 | 450 |
| Side-chain 1,2-diol structural unit content (mol %) | 3 | 3 | 1 |
| Saponification degree (% by mole) | 99< | 99< | 99< |

After adding 110 g of the resin A powder serving as nuclei to a liddable deep stainless-steel vat, 38.5 g of the above-obtained coating liquid was added dropwise thereto such that the powder was entirely wetted, and the thus wetted powder was agitated for 5 minutes using a stainless-steel spoon to spread the coating liquid over the entire powder. Subsequently, a lid was placed on the vat and the vat was left to stand for 1 hour at room temperature so as to age the powder, after which the lid was slightly opened and the vat was placed in a 105° C. hot-air dryer. The vat was repeatedly taken out and agglomerated powder generated by heat-drying was crushed every 10 minutes and, once agglomeration was no longer observed, the powder was dried to a constant weight by leaving the vat to stand at 105° C. for a total of at least 3 hours, whereby silica-coated powder of the resin A (3 wt % silica-coated product), in which a coating layer having a Si content of 3 wt % in terms of $SiO_2$ was formed on 100 parts by weight of the resin A, was obtained.

Example 2

Silica-coated powder of the resin B (3 wt % silica-coated product) was obtained in the same manner as in Example 1, except that the resin B was used as the raw material powder and the amount of methanol used for dilution in the coating liquid preparation was changed from 31.25 g to 23.4 g.

Example 3

Silica-coated powder of the resin C (3 wt % silica-coated product) was obtained in the same manner as in Example 1, except that the resin C was used as the raw material powder and the amount of methanol used for dilution in the coating liquid preparation was changed from 31.25 g to 23.4 g.

Example 4

<Composite Particles of PVA-Based Resin and Component Having Three-Dimensional Siloxane Structure>
(Preparation of Aqueous Silicate Solution)

To 2 g of a tetramethoxysilane oligomer (methyl silicate) which had a weight-average molecular weight of 550, a silica content of 52 wt % in terms of $SiO_2$ and a tetramethoxysilane content of 0.2 wt % or less, 1 g of 0.1 N hydrochloric acid was added, and the resultant was vigorously stirred. Methyl silicate and hydrochloric acid were initially separated in two layers, however, they were dissolved together and yielded a single-component liquid by hydrolysis of the methoxy groups of methyl silicate with slight heat generation. The thus obtained liquid was continuously stirred for another 5 minutes until the heat generation stopped and the liquid was cooled to room temperature, whereby a colorless and transparent aqueous silicate solution was obtained.

(Preparation of Aqueous PVA-Based Resin Solution)

Then, in a separate vessel, while vigorously stirring 20 g of desalted water, 6 g of powder of the resin A shown in Table 1 was slowly added thereto and dispersed such that no lump was formed, and the resultant was continuously stirred at room temperature until the powder was completely dissolved, whereby a pale yellow and transparent aqueous solution of the resin A was obtained.

(Preparation of Silicate Composite Particles)

The whole amount of the thus obtained aqueous solution of the resin A was added to the above-obtained aqueous silicate solution, and the resultant was continuously stirred for 30 minutes at room temperature to hydrolyze the remaining methoxy groups, whereby a pale yellow and transparent mixture was obtained. This mixture was added dropwise to 500 g of tetrahydrofuran, which is a poor solvent, to allow white powder to precipitate. This white powder was recovered by decantation and subsequently heated in a circulation dryer at 105° C. for 3 hours to be dried to a constant weight, and condensation of hydroxy groups in the system was thereby facilitated, as a result of which white silicate composite particles of the resin A were obtained. The thus obtained particles had a Si content of 15 wt % in terms of $SiO_2$.

Comparative Examples 1 to 3

The resins A, B and C shown in Table 1, on which neither of the silica coating and the silicate composite formation was performed, were evaluated in the following manner as resin powders of Comparative Examples 1, 2 and 3, respectively, along with the powders of Examples, and their performances were compared with those of the particles of Examples 1 to 4. The results thereof are shown in Table 2.

<Si Content>

The Si content values shown in Table 2 were calculated from the respective formulations of added materials. Specifically, the Si contents in the respective composite particles in terms of $SiO_2$ were determined from the $SiO_2$ content of the silicate raw material and the weight ratio of the raw materials used for blending.

<Water Dispersibility of Particles>

In a 50-ml glass sample vial, 40 ml of desalted water was placed and vigorously stirred with a stirring bar. Then, 4 g of each powder of Examples and Comparative Examples was weighed on a powder paper, and the powder was added to the water being stirred in the sample vial at room temperature over a period of about 10 seconds. After the vigorous stirring was continued for 30 seconds from the start of the addition, the stirring was terminated, and the resultant, from which the stirring bar was removed, was left to stand so as to verify the dispersibility of the particles in the initial stage of dissolution in water. The results thereof are shown in Table 2.

The treated powders of Examples 1 to 4 were all rapidly and uniformly wetted with water and monodispersible without forming lumps.

On the other hand, in Comparative Examples 1 to 3, some of the particles were agglomerated to form lumps in the center of a vortex immediately after the addition to water, before being dispersed. The lumps were swollen as-is to yield gelatinous agglomerated particles of 5 mm to 2 cm in diameter, which were not monodispersible by stirring alone.

The results thereof are shown in Table 2.

<Solubility Test>

After weighing 0.4 g of each powder of Examples and Comparative Examples in a 50-ml glass sample vial, 40 g of room-temperature desalted water was vigorously poured into the sample vial from a nozzle of a polyethylene wash bottle, whereby the powder was blown up in water and monodispersed. A lid was put on the sample vial immediately thereafter, and the sample vial was further vigorously shaken up and down by hand for 10 seconds. After confirming the absence of agglomeration, the sample vial was left to stand, allowing the powder to settle. After leaving the sample vial to stand for 6 hours at room temperature, the resulting supernatant was removed using a dropper, and the residue was heat-dried at 140° C. for 3 hours with the whole sample vial being placed in a circulation dryer. The sample weight was compared before and after the test to determine the residual rate (wt %). Similarly, a 6-hour solubility test was conducted at 40° C. using a 40° C. incubator for leaving the sample vial to stand.

In this test, the PVA-based resins were all used in such an amount that could be completely dissolved in a short time by continuous stirring, however, the samples were intentionally left to stand so as to emphasize their difference in dissolution rate. The results thereof are shown in Table 2.

As compared to the corresponding untreated powders (Comparative Examples 1 to 3), the particles of Examples 1 to 3 all had a considerably higher residual rate both at room temperature and 40° C. as well as, even taking into consideration the amount of the silica coating, a reduced dissolution rate. Even in Example 3 and Comparative Example 3 where the difference in residual rate was small in the room-temperature test due to the use of the resin C hardly soluble at a low temperature, the silica-coated particles of Example 3 had a higher residual rate in the 40° C. test. As for the particles of Example 4, the residual rate was higher than those of other Examples because of the high content of the insoluble silica component at 15 wt %. However, even if the residual rate of the resin part is calculated discounting the silica component, the residual rate is found to be 37 wt % after 6 hours at room temperature and 5 wt % after 6 hours at 40° C., which are both still higher than the residual rate of corresponding Comparative Example 1, therefore, it is seen that elution of the resin was suppressed by the composite formation with silicate.

<Swellability Test>

In a 10-ml glass sample vial, 1 g of each powder of Examples and Comparative Examples was weighed, and the dry layer height was recorded. Subsequently, 7 g of room-temperature desalted water was vigorously poured into the sample vial from a nozzle of a polyethylene wash bottle to blow up and monodisperse the powder in water, after which the powder was allowed to settle. When lumps were formed, they were crushed with a spoon to bring all of the powder into contact with water, and the sample vial was then left to stand, allowing the powder to settle. The sample vial was left to stand at room temperature and, after 2 hours from the addition of water, the height of the resulting layer was recorded, and the ratio of this layer height and the dry layer height was defined as the swelling degree. It is noted here that the layer height was visually measured.

In this test, the PVA-based resin particles were all used in such an amount that could be completely dissolved in a short time by continuous stirring, however, the samples were intentionally left to stand so as to reduce the dissolution rate and to thereby facilitate observation of the swelling characteristics. It is noted here that the swelling degree of each water-soluble resin was observed as a sum of the solubility and the swelling characteristics. Further, the outer appearance of the swollen particles were visually observed. The results thereof are shown in Table 2.

In the PVA-based resin composite particles of Examples 1 and 2, it was found that the composite particles were entirely milky white and translucent, and that a component having a three-dimensional siloxane crosslinked structure existed uniformly inside the PVA-based resin particles. In the PVA-based resin composite particles of Example 3, it was found that the vicinity of the surface was milky white and translucent with the center being transparent, and that a component having a three-dimensional siloxane crosslinked structure existed locally in the vicinity of the surface of the PVA-based resin 5 particles. Moreover, in the composite particles of Example 4, it was found that the composite particles were entirely milky white, and that a component having a three-dimensional siloxane crosslinked structure existed at a high concentration throughout the composite particles.

TABLE 2

|  | Example 1 | Example 2 | Example 3 | Example 4 | Comparative Example 1 | Comparative Example 2 | Comparative Example 3 |
| --- | --- | --- | --- | --- | --- | --- | --- |
| Average particle size (μm) | 300 | 300 | 500 | 500 | 300 | 300 | 500 |
| Resin used | A | B | C | A | A | B | C |
| Side-chain 1,2-diol structural unit content (mol %) | 3 | 3 | 1 | 3 | 3 | 3 | 1 |
| Average polymerization degree | 300 | 1,200 | 450 | 300 | 300 | 1,200 | 450 |
| Saponification degree (mol %) | 99< | 99< | 99< | 99< | 99< | 99< | 99< |
| Side-chain 1,2-diol skeleton | present | present | present | present | present | present | present |
| Silica coating | present | present | present | absent | absent | absent | absent |
| Silicate composite | absent | absent | absent | present | absent | absent | absent |
| Si content (wt % in terms of SiO$_2$) | 3 | 3 | 3 | 15 | 0 | 0 | 0 |
| Water dispersibility of particles | uniform wettability good dispersibility | uniform wettability good dispersibility | uniform wettability good dispersibility | uniform wettability good dispersibility | large lump formation | partial lump formation | partial lump formation |
| Residual rate (wt %) after 6 hours at room temperature | 5.4 | 68.3 | 80 | 46.5 | 2.5 | 47.3 | 77 |
| Residual rate (wt %) after 6 hours at 40° C. | 1.4 | 55.3 | 70.1 | 19.6 | 0.1 | 32.1 | 46.3 |
| Swelling degree after 2 hours at room temperature | 1.9 | 1.8 | 2.2 | 1.3 | 2 | 1.3 | 3.9 |
| Appearance of swollen particles | entirely milky white and translucent | entirely milky white and translucent | milky white and translucent in the vicinity of the surface and transparent in the center | entirely milky white | transparent particles | transparent particles | transparent particles |

Examples 5 to 8 and Comparative Examples 4 and 5

<Composite Particles Obtained by Hybrid Coating>

Organic-inorganic composite particles primarily aimed at suppression of initial dissolution were prepared by the following procedures.

As water-soluble resin raw materials for hybrid films, PVA-based resin particles A and D having the above-described basic structural units represented by formulae (1a) to (1c) were prepared.

Further, as PVA-based resin particles serving as nuclei, resin particles E having the above-described basic structural units represented by formulae (1a) to (1c) were prepared. In order to compare the solubility of these particles in water at 23° C., 0.1 g of each powder thereof was added to 20 g of water with stirring using a stirrer, and the time required for the powder to be dissolved was compared.

The physical properties of the resin particles A, D and E are shown in Table 3. The measurement conditions thereof were the same as in Table 1.

TABLE 3

|  | Water-soluble resin for coating | | Resin particle |
| --- | --- | --- | --- |
| Resin used | A | D | E |
| Resin species | PVA-based resin | PVA-based resin | PVA-based resin |
| Average particle size (μm) | 300 | 360 | 790 |
| Polymerization degree | 300 | 1,100 | 600 |
| Side-chain 1,2-diol structural unit content (mol %) | 3 | 6 | 1.5 |
| Saponification degree (mol %) | 99< | 99< | 99< |

(Preparation of Coating Liquid)

1) Preparation of Aqueous Silicate Solution

To 30.80 g of a tetramethoxysilane oligomer (methyl silicate) which had a weight-average molecular weight of 550 and a silica content of 52 wt % in terms of $SiO_2$, 62.20 g of methanol and 0.50 g of Aluminum Chelate D manufactured by Kawaken Fine Chemicals Co., Ltd. were added, and the resultant was stirred and homogeneously dissolved at room temperature. Subsequently, 6.50 g of desalted water was added, and the resultant was stirred to homogeneity and then aged for one day at room temperature in a hermetically closed state so as to allow hydrolysis and polycondensation to proceed, whereby a silicate hydrolysis solution having a silica content of 16 wt % in terms of $SiO_2$ was obtained.

To this silicate hydrolysis solution, desalted water was added at the ratio shown in Table 4 below to obtain an aqueous silicate solution.

2) Preparation of Water-Soluble Resin Solution

In a separate vessel, 32 g of desalted water was placed and, while vigorously stirring it using a stirring bar, 8 g of powder of the water-soluble resin A for coating shown in Table 3 was slowly added thereto and dispersed such that no lump was formed, and the resultant was heated to 50° C. and continuously stirred until the powder was completely dissolved, after which the resulting solution was cooled to room temperature to obtain a pale yellow and transparent 20 wt % aqueous solution. Further, a colorless and transparent 20 wt % water-soluble resin solution was obtained in the same manner, except that the resin A was changed to the resin D.

3) Preparation of Hybrid Coating Liquids

Hybrid coating liquids (coating liquids) of Examples and Comparative Examples were prepared by mixing the above-obtained aqueous silicate solution and water-soluble resin solution at the respective ratios shown in Table 4 below.

(Coating Treatment of PVA-Based Resin Particles)

In a 50-ml glass screw tubular vial, 5 g of PVA-based resin particles was weighed, and 1.50 g of the respective hybrid coating liquids containing a water-soluble resin was added dropwise thereto using a pipette such that the coating liquid was applied to the entire powder. After agitating the powder using a spatula such that the powder was entirely and uniformly wetted, a lid was put on the vial, and the vial was left at room temperature for 30 minutes so as to allow the coating liquid to settle with the powder.

(Heat-Drying)

The powder, while being crushed, was heated in a circulation dryer at 105° C. for 3 hours to be dried to a constant weight, and condensation of hydroxy groups in the system was thereby facilitated, as a result of which composite particles of Examples and Comparative Examples were obtained.

<Si Content in Hybrid Films>

The Si content in each hybrid film was calculated from the respective blending formulations. Specifically, the Si content in each hybrid film in terms of $SiO_2$ was determined from the $SiO_2$ content of the silicate raw material and the weight ratio of the raw materials used for blending. The results thereof are shown in Table 4.

<Solubility Test>

In this test, the solubility was tested for the particles of Examples 5 to 8 and Comparative Examples 4 and 5 by the following procedures.

1) Add 100 g of water having an adjusted temperature of 23° C. to a 140-cc mayonnaise bottle.

2) Prepare a nylon-mesh fabric of 10 cm×7 cm in size, fold the fabric in the middle of the long side, and heat-seal the edges to obtain a pouch of 5 cm×7 cm in size.

3) Place 1.0 g of a sample in this mesh pouch, and heat-seal the mouth to make a triangular pack.

4) Place the mesh pouch in the mayonnaise bottle, and stir the bottle at 23° C. for 1 hour.

5) Stop stirring, leave the bottle to stand in a 50° C. environmental tester, remove the nylon mesh after 1 hour, dry the sample, and calculate the residual rate based on the difference in weight before and after elution.

6) Conduct the test in the same manner at 50° C. after 7 days, and calculate the residual rate.

The test results are shown in Table 4.

As seen from the results of the solubility test, all of the composite particles with the hybrid coating generated no lump and had good water dispersibility. As compared to the PVA-based resin particles without coating, the composite particles with the hybrid coating had a reduced initial solubility after one hour of stirring at room temperature while they were completely dissolved at 50° C. by the 7th day, and the solubility inherent to PVA-based resin particles was not impaired.

In Example 8 where the PVA-based resin D having a larger molecular weight and a lower solubility was used in place of the PVA-based resin A used as the water-soluble resin in the hybrid film of Example 6, the residual rate at 50° C. after 7 days was increased reflecting the solubility of the resin in the film to found that the dissolution rate of the composite particles can thus be controlled by selecting the water-soluble resin in the film in addition to the $SiO_2$ concentration in the film.

The particles of Comparative Example 4, which were coated with only the water-soluble resin used in the hybrid coating, had a reduced initial solubility, however, the particles were agglomerated in the form of lumps in water, exhibiting poor dispersibility. It is thus believed that the residual amount was increased due to poor dispersion.

As shown in Table 3, the PVA-based resin A and D, which are water-soluble resins used in Examples, both had higher water solubility than the PVA-based resin constituting the PVA-based resin particles that served as nuclei, however, it was demonstrated that their initial solubility can be reduced by composite formation with a silicate.

<Water Dispersibility of Particles>

The water dispersibility in the above-described solubility test was verified by visually observing the subject composite particles in the mesh bag 5 minutes after the addition to water, with the stirring being stopped. The results thereof are shown in Table 4.

As seen from the results of the water dispersibility test of the particles, the particles of Examples 5 to 8 were all rapidly and uniformly wetted with water and monodispersible without forming lumps.

On the other hand, in Comparative Examples 4 and 5, some of the particles were agglomerated to form lumps in the bag immediately after the addition to water, before being dispersed. The particles each had a large size and were thus not agglomerated as a whole, however, a state where several particles adhered with each other and were encapsulated in a viscous liquid was observed.

<Water Resistance Test of Hybrid Films>

In order to investigate the water resistance of the hybrid coating films, the coating liquids used in Examples 5 to 7 and Comparative Example 4 were each applied to a glass slide using a spatula and subsequently dried and cured at 105° C. for 1 hour, whereby a transparent coating film of about 20 μm in thickness was obtained. The thus obtained coating film was immersed in 23° C. water for 1 hour along with the glass slide, and the glass slide was subsequently taken out and air-dried to observe the state of the coating film. The results thereof are shown in Table 5.

The film made of only the water-soluble resin of Comparative Example 4 was completely dissolved without trace after the test, however, all of the hybrid films of Examples 5 to 7 at least partially remained on the respective glass slides. Particularly, the coating film of Example 6 did not change at all in appearance. In this manner, it was confirmed that, even for those resins that are highly soluble in water and have no water resistance by themselves, the water resistance can be improved by allowing a component having a siloxane crosslinked structure to coexist, and they can be used as hybrid films that suppress initial dissolution of resin particles serving as cores.

TABLE 4

|  |  | Example 5 | Example 6 | Example 7 | Example 8 | Comparative Example 4 | Comparative Example 5 |
|---|---|---|---|---|---|---|---|
| Coating film | $SiO_2$ content in film (wt %) | 80 | 50 | 20 | 50 | 0 | — |
|  | Coating amount (wt %) | 3 | 3 | 3 | 3 | 3 | 0 |
| PVA-based resin particle | Resin used | E | E | E | E | E | E |
| Coating liquid raw materials | Resin used | A | A | A | D | A | — |
|  | Silicate raw material | methyl silicate | methyl silicate | methyl silicate | methyl silicate | — | — |
| Coating liquid formulation | Water-soluble resin solution (g) | 0.5 | 2.5 | 2 | 2.5 | 2.5 | — |
|  | Desalted water (g) | 2 | 4.375 | 2.375 | 4.375 | 2.5 | — |
|  | Silicate hydrolysis solution (g) | 2.5 | 3.125 | 0.625 | 3.125 | 0 | — |
| Coating treatment | PVA-based resin particle (g) | 5 | 5 | 5 | 5 | 5 | 5 |
|  | Coating liquid (g) | 1.5 | 1.5 | 1.5 | 1.5 | 1.5 | 0 |
| Water dispersibility | ○: good x: lump generation | ○ | ○ | ○ | ○ | x | x |
| Solubility test residual rate (wt %) | after 1 hour at room temperature | 62.2 | 88.4 | 82.4 | 85.6 | 69.7 | 50.1 |
|  | after 7 days at 50° C. | 0 | 4.3 | 0.6 | 7.9 | 0 | 0 |

TABLE 5

| Coating liquid used | | Example 5 | Example 6 | Example 7 | Comparative Example 4 |
|---|---|---|---|---|---|
| SiO$_2$ content in film | | 80 | 50 | 20 | 0 |
| Appearance of coating film | before immersion | partially cracked | uniform and transparent | uniform and transparent | uniform and transparent |
| | after immersion | Film remained with peeling at cracked part | Film remained with no change | Film remained with bulging and swelling | Film disappeared |

Examples 9 to 13 and Comparative Examples 6 and 7

<Composite Particles Obtained by Hybrid Coating>

Organic-inorganic composite particles primarily aimed at suppression of initial swelling were prepared by the following procedures.

As water-soluble resin raw materials for hybrid films, the above-described PVA-based resins A and D were prepared. The physical properties of the PVA-based resins A and D were as shown in Table 3 above.

As PVA-based resin particles, particles of a heat-treated product of a carboxylic acid-modified PVA-based resin, which is a high water-absorbing resin used in soil water-retaining materials and the like (a heat-treated product of a maleic acid-modified PVA-based resin), was prepared. The heat treatment of the maleic acid-modified PVA-based resin was performed by vacuum-drying the resin for 5 hours in a heat treatment can having a jacket temperature of 130 to 135° C. and subsequently heating the resin for 3 hours at 130 to 135° C. while supplying nitrogen gas to the heat treatment can at a rate of 24 Nm$^3$/h under normal pressure. The physical properties of the heat-treated product of the carboxylic acid-modified PVA-based resin are shown in Table 6. The measurement conditions thereof were the same as in Table 1.

TABLE 6

| | |
|---|---|
| Average polymerization degree | 1,800 |
| Average particle size (μm) | 1,300 |
| Saponification degree (mol %) | 96.5 |
| Modifying species | maleic acid |

Composite particles were obtained by performing preparation of a coating liquid, coating treatment of PVA-based resin particles and heat-drying process in the same manner as in the method of producing the organic-inorganic composite 10 particles of Examples 5 to 8. The blending formulations are shown in Table 7.

It is noted here that, in Example 13, as a silicate hydrolysis solution, a solution having a silica content of 16 wt % in terms of SiO$_2$, which was obtained by hydrolysis-polycondensation of 39.74 g of a tetraethoxysilane oligomer (ethyl silicate) that was used in place of methyl silicate and had a weight-average molecular weight of 483 and a silica content of 40 wt % in terms of SiO$_2$, 53.21 g of methanol and 0.50 g of Aluminum Chelate D using 6.55 g of desalted water in the same manner as described above, was used.

<Si Content in Hybrid Films>

The method of measuring the Si content in hybrid films was the same as in Example 5. The results thereof are shown in Table 7.

<Water Dispersibility of Particles>

The water dispersibility was evaluated by visually observing the state of the subject particles 5 minutes after the addition of water in the below-described swellability test. The results thereof are shown in Table 7.

Since the PVA-based resin particles used here are particles for water absorption applications that are hardly soluble in water, therefore, good water dispersibility was attained in all cases without adhesion of the particles and generation of lumps.

<Swellability Test>

In a 100-ml glass screw tubular vial, 0.1 g of each powder of Examples 9 to 13 and Comparative Examples 6 and 7 was weighed. Subsequently, 100 ml of 23° C. desalted water was vigorously poured into the vial from a graduated cylinder to blow up and monodisperse the powder in water, after which the powder was allowed to settle and the vial was left to stand at 23° C. The layer height of swollen particles was recorded at prescribed time intervals to determine the swelling rate, and whether or not the initial swelling was suppressed was compared. The results thereof are shown in Table 7 and the Drawing.

As shown in Table 7 and the Drawing, all of the organic-inorganic composite particles of Examples 9 to 13 exhibited largely suppressed swelling both after the first hour and after 5 hours, as compared to the particles of Comparative Example 7 that had no coating. However, the layer heights of the composite particles after 144 hours were substantially the same as that of the particles having no coating, therefore, it was found that the composite particles can be used in those applications utilizing swelling, such as soil water-retaining materials and water stoppers for civil engineering, without imparting the swelling characteristics inherent to the PVA-based resin particles serving as nuclei.

Also in Example 13 where ethyl silicate was used, the same swelling-suppressing effect was observed as in other Examples where methyl silicate was used.

In the particles of Comparative Example 6 that were coated with only the water-soluble resin, although swelling was suppressed after 1 hour, this effect was largely inferior to those of the composite particles of Examples. Moreover, the swelling-suppressing effect was no longer observed after 5 hours, with the layer height reaching the same level as that of the particles of Comparative Example 7 that had no coating.

In Example 12 where the PVA-based resin D having a higher molecular weight and a lower solubility was used in place of the PVA-based resin A used as the water-soluble resin in the hybrid film of Example 10, the layer height was reduced both after 1 hour and after 5 hours to found that swelling rate of the composite particles can thus be controlled by selecting the water-soluble resin in the film in addition to the SiO$_2$ concentration in the film.

The technology of the present invention is also applicable to water-absorbing resin particles other than PVA-based resin particles, however, the technology of the present invention in combination with PVA-based resin particles has an advantage in that all of the components can be constituted by materials having low environmental load. Such particles can be suitably used as, for example, lost circulation materials in well drilling applications.

TABLE 7

| | | Example 9 | Example 10 | Example 11 | Example 12 | Example 13 | Comparative Example 6 | Comparative Example 7 |
|---|---|---|---|---|---|---|---|---|
| Coating film | SiO$_2$ content in film (wt %) | 80 | 50 | 20 | 50 | 50 | 0 | — |
| | Coating amount (wt %) | 3 | 3 | 3 | 3 | 3 | 3 | 0 |
| PVA-based resin particle | Resin used | heat-treated product of carboxylic acid-modified PVA | heat-treated product of carboxylic acid-modified PVA | heat-treated product of carboxylic acid-modified PVA | heat-treated product of carboxylic acid-modified PVA | heat-treated product of carboxylic acid-modified PVA | heat-treated product of carboxylic acid-modified PVA | heat-treated product of carboxylic acid-modified PVA |
| Coating liquid raw materials | Resin used | A | A | A | D | A | A | — |
| | Silicate raw material | methyl silicate | methyl silicate | methyl silicate | methyl silicate | ethyl silicate | — | |
| Coating liquid formulation | Water-soluble resin solution (g) | 0.5 | 1.25 | 2 | 1.25 | 1.25 | 2.5 | — |
| | Desalted water (g) | 2 | 2.1875 | 2.375 | 2.1875 | 2.1875 | 2.5 | — |
| | Silicate hydrolysate solution (g) | 2.5 | 1.5625 | 0.625 | 1.5625 | 1.5625 | 0 | — |
| Coating treatment | Core particle (g) | 5 | 5 | 5 | 5 | 5 | 5 | 5 |
| | Coating liquid (g) | 1.5 | 1.5 | 1.5 | 1.5 | 1.5 | 1.5 | 0 |
| Water dispersibility | ○: good x: lump generation | ○ | ○ | ○ | ○ | ○ | ○ | ○ |
| Swelling test layer height (mm) | after 1 hour at room temperature | 12.5 | 10 | 11.5 | 6 | 10 | 19.5 | 32 |
| | after 5 hours at room temperature | 44 | 34 | 41 | 26 | 25 | 51.5 | 48 |
| | after 144 hours at room temperature | 61 | 53 | 54 | 61 | 50 | 54 | 55 |

<Diverting Agent Performance Test>

In order to confirm that the composite particles according to the present invention can be used as a diverting agent for low-temperature stratum (an agent for temporarily plugging well fractures) that is used in drilling of shale gas and the like, water permeability tests were conducted using the silica-coated composite particles of Example 2, the hybrid-coated composite particles of Examples 6 and 8, and the resin particles of Comparative Example 2 that are coating-free product of Example 2. Further, solubility tests were conducted using the particles of Example 2 and Comparative Example 2 and PVA-based resin particles (the particles C shown in Table 1).

(Water Permeability Test)

The composite particles of Examples 2, 6 and 8 and the resin particles of Comparative Example 2 were each mixed with a PVA pellet in accordance with the respective mass ratios shown in Table 8 to obtain test pieces. It is noted here that, as the PVA pellet, a pellet of a PVA-based resin containing a 1,2-diol structural unit in a side chain and having a 1,2-diol structural unit content of 2 mol %, a saponification degree of 99 mol % and a polymerization degree of 530 was used.

In a beaker, 20 g of water and 1 g of each test piece obtained above were added, and these materials were stirred for 60 minutes, after which a syringe ("S-20ESz" manufactured by Terumo Corporation (opening of the syringe tip: about 2 mm)) was inserted thereto and left to stand for 1 minute in an upright position with the syringe tip facing down. Thereafter, the plunger of the syringe was pushed with a load of about 2 kg for 30 seconds to recover the water discharged from the syringe tip, and the discharged amount of water was weighed and defined as the water permeation amount. The results of the water permeability test are shown in Table 8.

The silica-coated composite particles of Example 2 had a smaller discharged amount than the coating-free PVA-based resin particles of Comparative Example 2 and exhibited good sealing performance. Further, when the syringe was opened and the particles were observed, the particles were found to have maintained their individual shapes in a state that allows permeation of water. The hybrid-coated composite particles of Example 6 and 8 exhibited superior sealing performance, with the composite particles of Example 8, in which a PVA-based resin having a lower solubility than that of Example 6 was used as the resin in the film, having a smaller discharged amount and exhibiting particularly good sealing performance.

TABLE 8

| | Test piece | | | | |
|---|---|---|---|---|---|
| | Composite particle | | | | Water |
| | PVA-based resin particle | Coating layer | Resin particle | Pellet | Composite particle or resin particle:pellet | permeation amount (g) |
| Example 2 | B | Silica coating | — | PVA pellet | 3:7 | 1.6 |
| Example 6 | E | Hybrid coating | — | PVA pellet | 3:7 | 0.7 |
| Example 8 | E | Hybrid coating | — | PVA pellet | 3:7 | 0.2 |
| Comparative Example 2 | — | — | B | PVA pellet | 3:7 | 7.5 |

(Solubility Test)

For the particles of Example 2, the particles of Comparative Example 2 which are the same PVA-based resin particles as those of Example 2 but without silica coating, and the particles of Reference Example 1, a solubility test was conducted by the same procedures as in the solubility test of the composite resin particles obtained by hybrid coating according to Example 5, except that the retention temperature after the 1-hour stirring was changed to 40° C. At the same time, the dispersibility at the time of the addition to water was visually observed.

The test results are shown in Table 9 below. It is noted here that the properties of the PVA-based resin particles were as shown in Table 1 above.

In the composite particles of Example 2, dissolution was suppressed by the introduction of a three-dimensional siloxane crosslinked structure in the first day to exhibit a higher residual rate than the resin particles of Comparative Example 2 and Reference Example 1. Then, the composite particles of Example 2 are rapidly dissolved thereafter, showing a lower residual rate than the resin particles of Reference Example 1 after 28 days. The particles of Comparative Example 2 having no silica coating exhibited similar dissolution characteristics, however, since they readily form lumps when dispersed in water, it was considered difficult to make these particles into a slurry. On the other hand, the particles of Reference Example 1 showed hardly any change in residual rate after the first day, and at least 30% of the particles remained even after 28 days.

In other words, in a low-temperature geothermal layer of about 40° C., the composite particles of Example 2 exhibit sealing performance by remaining within the first day after being pressure-injected into cracks and subsequent hydraulic fracturing, and are rapidly dissolved thereafter to allow gas extraction.

On the other hand, as a result of selecting resin particles hardly soluble in an early stage as the resin particles of Reference Example 1, dissolution thereof hardly proceeds even after 28 days, and a sealed state is maintained over a long period.

As for the particles of Examples 6 and 8 as well, the initial dissolution was suppressed and the particles were rapidly dissolved thereafter at 50° C. as shown in Table 4 above, therefore, similarly, these particles can be used as a diverting agent (an agent for temporarily plugging cracks) in a low-temperature geothermal layer having a temperature of 50° C.

TABLE 9

| | PVA-based resin particle | Coating layer | Water dispersibility | Residual rate at 40° C. (wt %) | |
|---|---|---|---|---|---|
| | | | | 1 day | 28 days |
| Example 2 | B | Silica coating | Good | 43 | 15 |
| Comparative Example 2 | B | — | Lump generation | 38 | 10 |
| Reference Example 1 | C | — | Good | 35 | 35 |

In the composite particles of the present invention, by incorporating a siloxane crosslinked structure, the dissolution rate and the swelling rate can be broadly controlled while maintaining the basic performance of water-soluble or swellable PVA-based resin particles. Particularly, in cases where a coating layer is formed on the surfaces of the PVA-based resin particles by silica coating or hybrid coating, rapid swelling and dissolution of the composite particles in an early stage are suppressed with the low-temperature solubility being maintained when the composite particles are dispersed in water, so that dispersion in water, slurry transfer and the like can be performed easily.

PVA-based resins are also useful as biodegradable resins, and the $SiO_2$ component introduced to obtain the composite resin particles of the present invention is, too, a component having a low environmental load.

Because of these properties of the present invention, the ease of handling is expected to be improved in conventionally known applications where PVA-based resin particles are dissolved or swollen.

Furthermore, the use of the composite particles of the present invention has a prospect of being extended to novel applications where the composite particles are utilized as a biodegradable and/or water-soluble water retention material, water stopper or filler, such as agricultural soil improvement agents, civil engineering and construction, tunnel excavation, and well drilling applications for oil, natural gas and shale gas (lost circulation materials and diverting agents).

What is claimed is:

1. An organic-inorganic composite particle comprising a polyvinyl alcohol-based resin and a component having a three-dimensional siloxane crosslinked structure that is derived from a hydrolysis-polycondensation product of an alkoxysilane and/or a low condensate thereof,
   wherein the alkoxysilane comprises a T unit and/or a Q unit as a structural unit(s), and
   a silicon content with respect to a total weight of the composite particles is 0.1 wt % or more and 23 wt % or less in terms of $SiO_2$, wherein the polyvinyl alcohol-based resin and the component having a three-dimensional siloxane crosslinked structure are arranged as a particle.

2. The organic-inorganic composite particle according to claim 1,
wherein the organic-inorganic composite particle has a structure in which the polyvinyl alcohol-based resin is coated with a $SiO_2$ layer comprising the three-dimensional siloxane crosslinked structure.

3. The organic-inorganic composite particle according to claim 1,
wherein the organic-inorganic composite particle has a structure in which the polyvinyl alcohol-based resin is coated with a hybrid film that comprises the component having the three-dimensional siloxane crosslinked structure and a water-soluble resin.

4. The organic-inorganic composite particle according to claim 3,
wherein the hybrid film has a silicon content of 15 wt % or more and less than 100 wt % in terms of $SiO_2$.

5. The organic-inorganic composite particle according to claim 2,
wherein the component having the three-dimensional siloxane crosslinked structure exists in the vicinity of the surface of the polyvinyl alcohol-based resin.

6. The organic-inorganic composite particle according to claim 3,
wherein the component having the three-dimensional siloxane crosslinked structure exists in the vicinity of the surface of the polyvinyl alcohol-based resin.

7. The organic-inorganic composite particle according to claim 1,
wherein the component having the three-dimensional siloxane crosslinked structure uniformly exists inside the polyvinyl alcohol-based resin.

8. The organic-inorganic composite particle according to claim 1,
wherein the polyvinyl alcohol-based resin is a nonionic group-containing polyvinyl alcohol-based resin.

9. The organic-inorganic composite particle according to claim 1,
wherein the composite particles have a Si—O—C structure that is derived from a reaction between a hydroxy group of the polyvinyl alcohol-based resin and a hydroxy group of the hydrolysis-polycondensation product of the alkoxysilane and/or low condensate thereof.

10. A diverting agent comprising organic-inorganic composite particles according to claim 1.

11. A lost circulation material comprising organic-inorganic composite particles according to claim 1.

12. A fracture plugging method comprising a step of filling some of fractures formed in a well wall with the diverting agent according to claim 10.

13. A method of preventing lost circulation of drilling mud,
wherein the method comprises a step of filling some of fractures formed in a well wall with the lost circulation material according to claim 11.

14. The organic-inorganic composite particle according to claim 1,
wherein the organic-inorganic composite particle has the average particle size (d50) of 1 μm to 3,000 μm.

15. The organic-inorganic composite particle according to claim 1,
wherein the organic-inorganic composite particle is a powder or a pellet; the powder having a granular shape or a pearl shape; and the pellet having a cylindrical shape or a spherical shape.

* * * * *

UNITED STATES PATENT AND TRADEMARK OFFICE
CERTIFICATE OF CORRECTION

PATENT NO. : 10,570,327 B2
APPLICATION NO. : 16/191847
DATED : February 25, 2020
INVENTOR(S) : Hanako Katou et al.

It is certified that error appears in the above-identified patent and that said Letters Patent is hereby corrected as shown below:

On the Title Page

Item (73), Assignee (Line 1), please change "THE NIPPON SYNTHETIC CHEMICAL INDUSTRY CO., LTD." to -- Mitsubishi Chemical Corporation --

Signed and Sealed this
Twenty-first Day of July, 2020

Andrei Iancu
*Director of the United States Patent and Trademark Office*